(12) United States Patent  
Kawano et al.

(10) Patent No.: US 7,203,951 B2
(45) Date of Patent: Apr. 10, 2007

(54) OPTICAL HEAD DEVICE FOR AN OPTICAL DISK APPARATUS READING AND WRITING INFORMATION ON AN OPTICAL DISK

(75) Inventors: Noriyuki Kawano, Tokyo (JP); Nobuo Uekusa, Tokyo (JP)

(73) Assignee: TDK Corporation, Tokyo (JP)

( * ) Notice: Subject to any disclaimer, the term of this patent is extended or adjusted under 35 U.S.C. 154(b) by 162 days.

(21) Appl. No.: 10/448,358

(22) Filed: May 30, 2003

(65) Prior Publication Data

US 2004/0022168 A1 Feb. 5, 2004

(30) Foreign Application Priority Data

May 31, 2002 (JP) ............................. 2002-158886

(51) Int. Cl.
*G11B 7/08* (2006.01)
(52) U.S. Cl. ..................................... 720/683
(58) Field of Classification Search ................. 720/683
See application file for complete search history.

(56) References Cited

U.S. PATENT DOCUMENTS

| 4,646,283 | A | * | 2/1987 | Ito et al. ....................... 369/256 |
| 4,987,565 | A | * | 1/1991 | Ikegame ................... 369/44.15 |
| 5,018,836 | A | * | 5/1991 | Noda et al. .................. 359/814 |
| 5,673,152 | A | * | 9/1997 | Yokota et al. ............... 359/813 |
| 6,741,543 | B1 | * | 5/2004 | Suzuki et al. ................ 720/683 |
| 2002/0054559 | A1 | * | 5/2002 | Choi ........................... 369/244 |

FOREIGN PATENT DOCUMENTS

JP 2001-229555 8/2001

* cited by examiner

Primary Examiner—David Davis
(74) Attorney, Agent, or Firm—Oblon, Spivak, McClelland, Maier & Neustadt, P.C.

(57) ABSTRACT

An optical head device for an optical disk apparatus for optically reading and writing information by irradiating a light spot onto an information recording surface of an optical recording medium, which is capable of moving an objective lens to a predetermined position even when part of the drive coil is included in an neutral area n in the vicinity of the magnetic boundary. There are provided two driving force generating units, including two magnets 50a and 50b disposed in the tangential direction of an optical disk separately on the opposite sides of an objective lens 10, and coil units 60a and 60b for generating the driving force directed against the magnets 50a and 50b disposed on a lens holder 20, and the magnets 50a and 50b and the coil units 60a and 60b are arranged in such a manner that the driving force other than the driving force generated for tracking movement and the moment act against each other at the two driving force generating units.

20 Claims, 9 Drawing Sheets

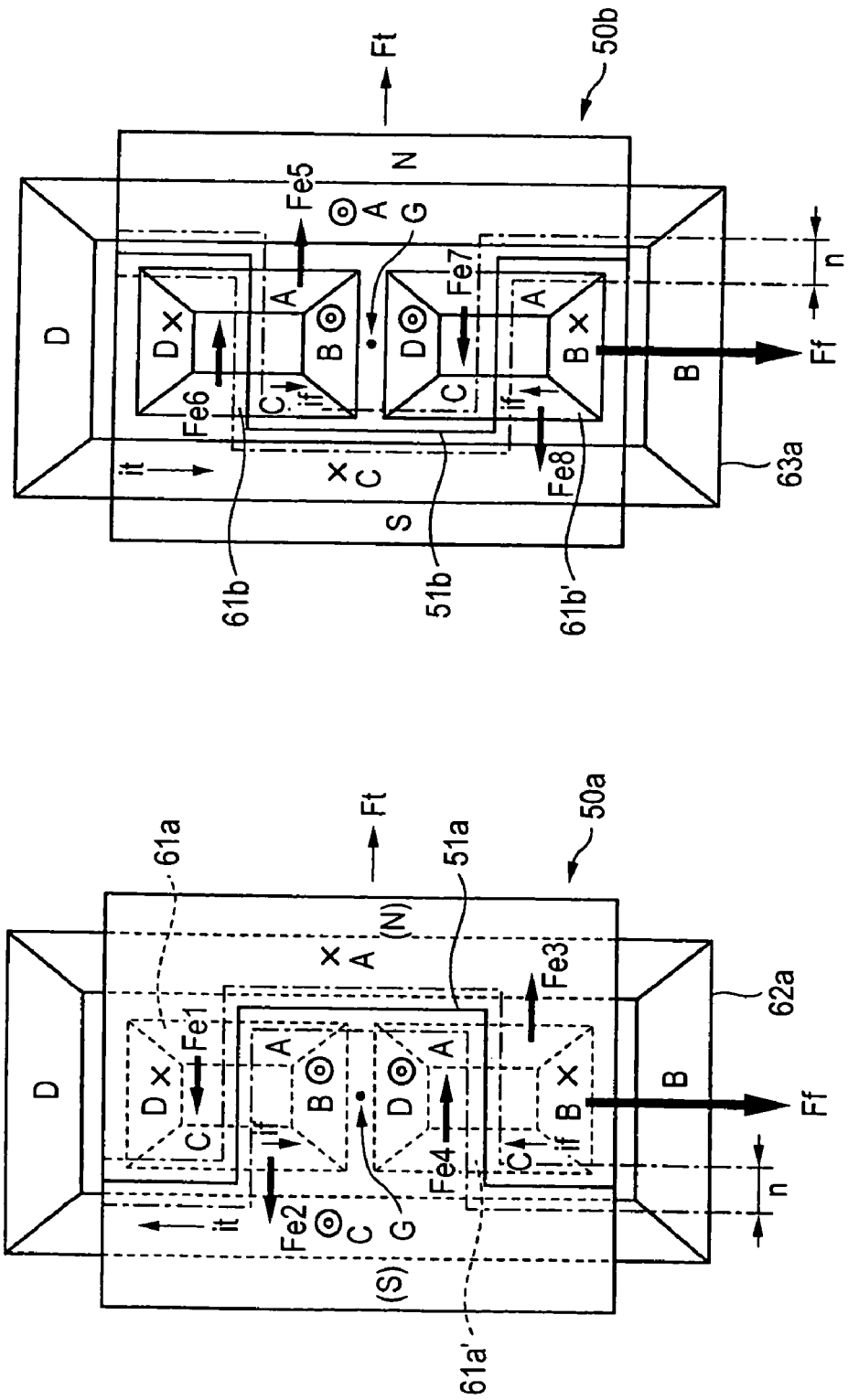

OPTICAL HEAD DEVICE FOR AN OPTICAL DISK APPARATUS READING AND WRITING INFORMATION ON AN OPTICAL DISK

BACKGROUND OF THE INVENTION

The present invention relates to an optical head device for an optical disk apparatus for optically reading and writing information by irradiating a light spot onto a information recording surface of an optical disk (optical recording medium)

An optical head device for an optical disk apparatus generally includes an objective lens drive unit having an objective lens, and an optical system for receiving and transmitting a beam via the optical lens, and has such construction that the objective lens drive unit is disposed on a mounting base for an optical system block.

The objective lens drive unit is generally constructed of a movable unit including an objective lens, a focus coil, and a tracking coil, and a stationary unit provided with a magnetic circuit. The movable unit is supported by the stationary unit via a plurality of elastic supporting members. The elastic supporting member is enclosed at least partly by a shock-absorbing material.

In accordance with recent increase in speed of the optical disk apparatus, there is a need for a highly sensitive objective lens drive unit. In JP-A-2001-229555, an objective lens drive unit and an optical head device using the same in which a layout of a magnet, a focus coil and a tracking coil, which can provide a highly sensitive objective lens drive unit, is disclosed.

Referring now to FIG. 8 and FIG. 9, an optical head device in the related art will be described. FIG. 8 is an exploded perspective view showing a construction of an objective lens drive unit of the optical head device in the related art. The objective lens drive unit shown in FIG. 8 has such construction that a coil and a magnet are disposed on both sides of an objective lens 210 respectively in tangential direction of an optical recording medium so as to be capable of driving the objective lens 210 with a high degree of sensitivity.

As shown in FIG. 8, the objective lens 210 is held by a lens holder 220 so as to oppose an information recording surface of an optical recording medium, not shown, for focusing an optical beam and irradiating the focused optical beam on the information recording surface of the optical recording medium to record or reproduce information.

The lens holder 220 shown in FIG. 8 has a coil unit 260a adhered on a left side surface S1, and a coil unit 260b adhered on a right side surface S2, which opposes the left side surface S1 in substantially parallel therewith. The lens holder 220 is formed substantially symmetrically with respect to a plane including an optical axis of the objective lens 210 and being parallel with the left and the right side surfaces S1 and S2, and is also formed substantially symmetrically with respect to a plane including the optical axis of the objective lens 210 and intersecting with the left and the right side surfaces S1 and S2. The coil units 260a and 260b are also formed symmetrically with respect to the planes described above. Therefore, the lens holder 220 and the coil units 260a and 260b adhered on both side surfaces of the lens holder 220 are integrated, and the center of gravity of a movable unit 200 including the objective lens 210 is located on the optical axis of the objective lens 210 in the lens holder 220.

The coil units 260a and 260b have focus coils 261a and 261b, which are wound into a rectangular shape and connected in series, respectively. The focus coils 261a and 261b are wound so as to generate the substantially same forces in the focusing direction when being energized. The coil unit 260a includes two tracking coils 262a and 262b connected in series are provided on both sides of the focus coil 261a. The coil unit 260b includes two tracking coils 263a and 263b connected in series on both sides of the focus coil 261b. The tracking coils 262a and 262b and the tracking coils 263a and 263b are connected in series. The tracking coils 262a, 262b, 263a, and 263b are wound so as to generate the substantially same forces in the tracking direction when being energized.

The lens holder 220 includes four wire wound coil-connecting portions 265. One of these wire wound coil-connecting portions 265 is connected to one terminal of the focus coils 261a and 261b connected in series via a leading portion (not shown) of a wire wound coil, and another wire wound coil-connecting portion 265 is connected to the other terminal of the focus coils 261a and 261b via a leading portion (not shown) of a wire wound coil.

Still another wire wound coil-connecting portion 265 is connected to one terminal of the tracking coils 262a, 262b, 263a, and 263b connected in series via a wire wound coil leading portion (not shown), and still another wire wound coil-connecting portion 265 is connected to the other terminal of the tracking coils 262a, 262b, 263a, 263b. Each wire wound coil-connecting portion is connected to one end of each of four conductive elastic bodies 270 by welding or the like. The lens holder 220 supported by four conductive elastic bodies 270 and the coil units 260a and 260b adhered on both side surfaces of the lens holder 220 are integrated and constitute the movable unit 200 including the objective lens 200.

The other end of the conductive elastic body 270 is fixedly soldered to abase substrate 280. Accordingly, the movable unit 200 is cantilevered so as to be capable of moving with respect to the stationary unit including a yoke base 230, two yokes 231a and 231b, a wire base 240, two magnets 250a and 250b, and the base substrate 280.

The coil unit 260a is disposed in a magnetic circuit formed by a magnet 250a, which is adhered on the yoke 231a on the yoke base 230. The coil unit 260b is disposed in a magnetic circuit formed by the magnet 250b, which is adhered on the yoke 231b on the yoke base 230.

The coil surface of the coil unit 260a is disposed so as to face one magnetized surface 250as of the magnet 250a. The magnet 250a, which is substantially rectangular solid, is bipolarized; one in a recessed area and the other in a rectangular solid area to be fitted thereto, as shown by an image line 251a, which represents a magnetic boundary. The recessed area facing the coil unit 260a is magnetized in the S-Pole, and the rectangular solid area is magnetized in the N-Pole.

The coil surface of the coil unit 260b is disposed so as to face one magnetized surface 250bs of the magnet 250b. The magnet 250b, which is substantially rectangular solid, is bipolarized; one in a recessed area and the other in a rectangular solid area to be fitted thereto, as shown by an image line 251b, which represents a magnetic boundary. The recessed area facing the coil unit 260b is magnetized in the S-Pole, and the rectangular solid area is magnetized in the N-Pole. When the magnet 250a is rotated by 180° about an axis which extends in the direction of the optical axis of the objective lens 210 shown in FIG. 8, the same magnetized state as the magnet 250b is achieved.

Subsequently, referring to FIG. 9, magnetized areas of the magnets 250a and 250b in the optical head device and the positional relation among the focus coils 261a and 261b and the tracking coils 262a, 262b, 263a and 263b will be described. FIG. 9A shows a positional relation between the magnet 250a and the coil unit 260a when viewing the lens holder 220 in the direction indicated by V in FIG. 8. In FIG. 9A, the magnet 250a is positioned on the near side with respect to the coil unit 260a. As described before, the recessed area of the magnet 250a facing the coil unit 260a is magnetized in a S-Pole and the rectangular solid area is magnetized in a N-Pole. As shown in FIG. 9A, the focus coil 261a is wound into a rectangular shape. The two tracking coil 262a and 262b are disposed on both sides of the focus coil 261a. The tracking coils 262a and 262b are also wound into rectangular shapes.

As a matter of convenience, four sides of the rectangular of the focus coil 261a is supposedly divided into areas of A, B, C, and D as shown in FIG. 9A, the side B of the focus coil 261a is disposed at the position facing the S-Pole of the magnet 250a, so that a magnetic flux travels in the direction from the surface of the drawing toward the near side (shown by a double-circle in the drawing). The side D opposing the side Bis disposed at the position facing the N-Pole, so that a magnetic flux travels in the direction from the near side toward the surface of the drawing (shown by a cross in the drawing). The side A and the side C of the focus coil 261a are disposed at the positions crossing over the N-Pole and the S-Pole of the magnet 250a.

As in the case of the focus coil 261a, when supposedly dividing the four sides of the tracking coils 262a and 262b into regions of A, B, C, and D as shown in FIG. 9A, the side A of the tracking coil 262a is disposed at the position facing the N-Pole of the magnet 250a, so that a magnetic flux travels in the direction from the near side toward the surface of the drawing (shown by a cross in the drawing). The side C opposing the side A is disposed at the position facing the S-Pole, so that a magnetic flux travels in the direction from the surface of the drawing toward the near side (shown by a double-circle in the drawing). The side B and the side D of the tracking coil 262a are disposed at the positions crossing over the N-Pole and the S-Pole of the magnet 250a.

The side A of the tracking coil 262b is disposed at the position facing the S-Pole of the magnet 250a, so that a magnetic flux travels in the direction from the surface of the drawing toward the near side (shown by a double-circle in the drawing). The C side opposing the A side is disposed at the position facing the N-Pole, and a magnetic flux travels in the direction from the near side toward the surface of the drawing (shown by a cross in the drawing). The side B and the side D of the tracking coil 262b are disposed at the positions crossing over the N-Pole and the S-Pole of the magnet 250a.

The tracking coils 262a and 262b are wound in such a manner that the direction of a current flowing along the side A of one tracking coil 262a is opposite from the direction of a current flowing along the side A of the other tracking coil 262b.

FIG. 9B shows a positional relationship between the magnet 250b and the coil unit 260b when viewing the lens holder 220 in the direction indicated by an arrow V in FIG. 8. In FIG. 9B, the magnet 250b is positioned on the further side with respect to the coil unit 260b. As described above, the recessed area facing the coil unit 260b is magnetized in the S-Pole, and the rectangular solid area is magnetized in the N-Pole. As shown in FIG. 9B, the focus coil 261b is wound into a rectangular shape. The two tracking coil 263a and 263b are disposed on both sides of the focus coil 261b. The tracking coils 263a and 263b are also wound in a rectangular shape, respectively.

The side B of the focus coil 261b is disposed at the position facing the S-Pole of the magnet 250b, so that a magnetic flux travels in the direction from the near side toward the surface of the drawing (shown by a cross in the drawing). The side D opposing the side B is disposed at the position facing the N-Pole, so that a magnetic flux travels in the direction from the surface of the drawing toward the near side (shown by a double-circle in the drawing). The side A and the side C of the focus coil 261b are disposed at the positions crossing over the N-Pole and the S-Pole of the magnet 250b.

The side A of the tracking coil 263a is disposed at the position facing the N-Pole of the magnet 250b, so that a magnetic flux travels in the direction from the surface of the drawing toward the near side (shown by a double-circles in the drawing). The side C opposing the side A is disposed at the position facing the S-Pole, so that a magnetic flux travels from the near side toward the surface of the drawing (shown by a cross in the drawing). The side B and the side D of the tracking coil 263a are disposed at the positions crossing over the N-Pole and the S-Pole of the magnet 250b.

The side A of the tracking coil 263b is disposed at the position facing the S-Pole of the magnet 250b, so that a magnetic flux travels in the direction from the near side toward the surface of the drawing (shown by a cross in the drawing). The side C opposing the side A is disposed at the position facing the N-Pole, so that a magnetic flux travels in the direction from the surface of the drawing to the near side (shown by a double-circles in the drawing). The side B and the side D of the tracking coil 263b are disposed at the positions crossing over the N-Pole and the S-Pole of the magnet 250b.

The tracking coils 263a and 263b are wound in such a manner that the direction of a current flowing along the side A of one tracking coil 263a is opposite from the direction of a current flowing along the side A of the other tracking coil 263b.

When the coil surface of the optical head device having the objective lens drive unit constructed as described above is disposed in substantially parallel with the radial direction of the optical disk, and the focus coils 261a and 261b and the tracking coils 262a, 262b, 263a, and 263b in the coil units 260a and 260b are energized, a force acting on the coil according to a Fleming's left hand rule is generated, and thus the lens holder 220 can be moved in desired directions. When the focus coils 261a and 261b are energized, a driving force for moving the side B and the side D in the focusing direction (vertical direction in FIG. 9), and when the tracking coils 262a, 262b, 263a, and 263b are energized, a driving force for moving the side A and side C in the tracking direction (lateral directions in FIG. 9) is generated.

For example, when a current is flown in the focus coils 261a and 261b in the directions indicated by an arrow if as shown in FIG. 9, a force Ff acting in the upward direction in the drawing is generated. Accordingly, the objective lens 210 can be moved correspondingly to the fluctuation of the surface of the optical disk. For example, the objective lens 210 can be moved by the focus coils 261a and 262a in the direction substantially vertical to the information recording surface of the optical disk to adjust a focusing position.

As shown in FIG. 9, when a current is flown in the tracking coils 262a, 262b, 263a, and 263b in the direction indicated by an arrow it, a force Ft acting toward the right in the drawing is generated. Accordingly, the objective lens 210 can be moved corresponding to eccentricity of the optical disk. For example, the tracking position can be adjusted by moving the objective lens 210 radially of the optical disk by the tracking coils 262a, 262b, 263a, and 263b.

In the objective lens drive unit of the optical head device having the construction described thus far, a driving action in a case in which part of any sides of the tracking coils 262a, 262b, 263a, and 263b are included in neutral areas n in the vicinity of the magnetic boundaries 251a and 251b, will be described. In the neutral areas n, the magnetic flux is not present, or is present but in a very low density.

As shown in FIG. 9A, a right portion of the side B of the tracking coil 262a and a left position of the side B of the tracking coil 262b are included in the neutral area n in the vicinity of the magnetic boundary 251a of the magnet 250. Therefore, when an attempt is made to move the movable portion 200 toward the right in FIG. 9, for example, by energizing the tracking coils 262a, 262b, 263a, and 263b, a downward force, which is generated at the right portion of the side B of the tracking coil 262a (included in the neutral area n), is smaller than the upward force, which is generated at the right portion of the side D of the tracking coil 262a. Therefore, in FIG. 9, when the tracking coil 262a is energized, an upward force Fe1, as well as force to move the lens holder 220 rightward, is generated.

Likewise, an upward force, which is generated at the left portion of the side B of the tracking coil 262b (included in the neutral area n), is smaller than a downward force, which is generated at the left portion of the side D of the tracking coil 262b. Therefore, in FIG. 9, when the tracking coil 262b is energized, a downward force Fe2, as well as a force to move the lens holder 220 rightward, is generated. Therefore, from the coil unit 260a, a moment, which rotates the lens holder 220 clockwise when viewing in the direction indicated by an arrow V in FIG. 8, is generated.

On the other hand, as shown in FIG. 9B, the right portion of the side B of the tracking coil 263a and the left portion of the side B of the tracking coil 263b are included in the neutral area n in the vicinity of the magnetic boundary 251b of the magnet 250b. Therefore, for example, when an attempt is made to move the movable portion 200 toward the right in FIG. 9 by energizing the tracking coils 262a, 262b, 263a, and 263b, a downward force, which is generated at the right portion of the side B of the tracking coil 263a (included in the neutral area n), is smaller than an upward force, which is generated on the right portion of the side D of the tracking coil 263a. Therefore, in FIG. 9B, when the tracking coil 263a is energized, an upward force Fe3, as well as a force to move the lens holder 220 rightward, is generated.

Likewise, an upward force, which is generated on the left portion of the side B of the tracking coil 263b (included in the neutral area n) is smaller than a downward force, which is generated on the left portion of the side D of the tracking coil 263b. Therefore, in FIG. 9B, when the tracking coil 263b is energized, a downward force Fe4, as well as a force to move the lens holder 220 rightward is generated. Therefore, a moment for rotating the lens holder 220 clockwise when viewing in the direction indicated by the arrow V in FIG. 8 is generated from the coil unit 260b.

In order to increase the sensitivity in the tracking direction, it is preferable to secure the lengths of the sides A and the sides C of the tracking coils 262a, 262b, 263a, and 263b as long as possible. However, the objective lens drive unit disclosed in the aforementioned publication, when the lengths of the sides A and the sides C of the tracking coils 262a, 262b, 263a, and 263b are increased, the sides B partly overlap the neutral areas n along the magnetic boundaries 251a and 251b. When energized for moving the lens holder 220 in the direction indicated by the arrow Ft in this state, a moment is generated by unnecessary forces Fe1 to Fe4. Therefore, there arises a problem in that a rolling about the tangential direction occurs and thus the optical axis of the objective lens 210, which is mounted to the lens holder 220 is inclined into the direction radially of the optical recording medium when an attempt is made to move the movable portion 220 only in the tracking direction by a predetermined extent.

In addition, there arises a problem in that when the widths of the magnets 250a and 250b in the focusing direction so as to avoid overlapping of the sides B of the tracking coils 262a, 262b, 263a, and 263b and the neutral areas n along the magnetic boundaries 251a and 251b, the thickness of the movable portion 200 must be increased, and thus reduction of size and weight of the apparatus is hindered.

SUMMARY OF THE INVENTION

In order to solve the problems described above, it is an object of the invention to provide an optical head device in which an objective lens can be moved to a predetermined position even when part of a drive coil is included in the neutral area n in the vicinity of the magnetic boundary, so that the size and the weight can be reduced, and an optical reproducing apparatus using the same.

The above-described object is achieved by an optical head device including: a lens holder having an objective lens mounted thereon, a first driving force generating unit including a first coil unit having a first drive coil held on one side surface of the lens holder, and a first magnet facing the first coil unit, and generating a desired driving force as well as a driving force different from the desired driving force, or a moment based on the different driving force; and a second driving force generating unit including a second coil unit having a second drive coil held on the other side surface of the lens holder opposing said one side surface, and a second magnet facing the second coil unit, and generating a desired force as well as a driving force or a moment for canceling the different driving force or the moment generated at the first driving force generating unit.

In the optical head device according to the invention, the first and the second drive coils are tracking coils and the different driving force is generated in the focusing direction.

In an optical head device according to the invention, the first and the second drive coils are focusing coils and the different driving force is generated in the tracking direction.

The above-described object is achieved also by an optical head device including a lens holder having an objective lens mounted thereon, a first driving force generating unit including a first coil unit having a first drive coil held on one side surface of the lens holder, and a first magnet facing the first coil unit, and generating a desired driving force as well as a moment generated due to the fact that distribution of the driving force of the first drive coil is different; and a second driving force generating unit including a second coil unit having a second drive coil held on the other side surface of the lens holder opposing said one side surface, and a second magnet facing the second coil unit, and generating a desired force as well as a moment for canceling the moment generated at the first driving force generating unit. Preferably, the first and the second drive coils are either one of the focus coil or the tracking coil.

In the optical head device of the invention, the first drive coil is partly positioned in the vicinity of a magnetic boundary on the opposed surface of the first magnet, and the second drive coil is partly positioned in the vicinity of a magnetic boundary on the opposed surface of the second magnet.

In the optical head device of the invention, a surface of the first magnet opposing the first drive coil includes a recessed are magnetized in a first magnetic pole and a projected area fitted therein and magnetized in a second magnetic pole, and a surface of the second magnet opposing the second drive coil includes a recessed area magnetized in the second magnetic pole and disposed in the opposite direction from the recessed area of the first magnet, and a projected area fitted therein and magnetized in the first magnetic pole.

In the optical head device of the invention, the surface of the first magnet opposing the first drive coil includes a L-shaped area magnetized in the first magnetic pole and an inverted L-shaped area magnetized in the second magnetic pole, and the surface of the second magnet opposing the second drive coil includes a L-shaped area magnetized in one of the first and the second magnetic poles and an inverted L-shaped area magnetized in the other pole.

The above-described object is achieved by an optical reproducing apparatus including the optical head device according to the invention.

BRIEF DESCRIPTION OF THE DRAWINGS

FIGS. 4A and 4B are drawings showing magnetization of magnets and layout of focus coils and tracking coils in still another optical head device according to the first embodiment of the invention;

DETAILED DESCRIPTION OF THE PREFERRED EMBODIMENTS

[First Embodiment]

Figure 1:
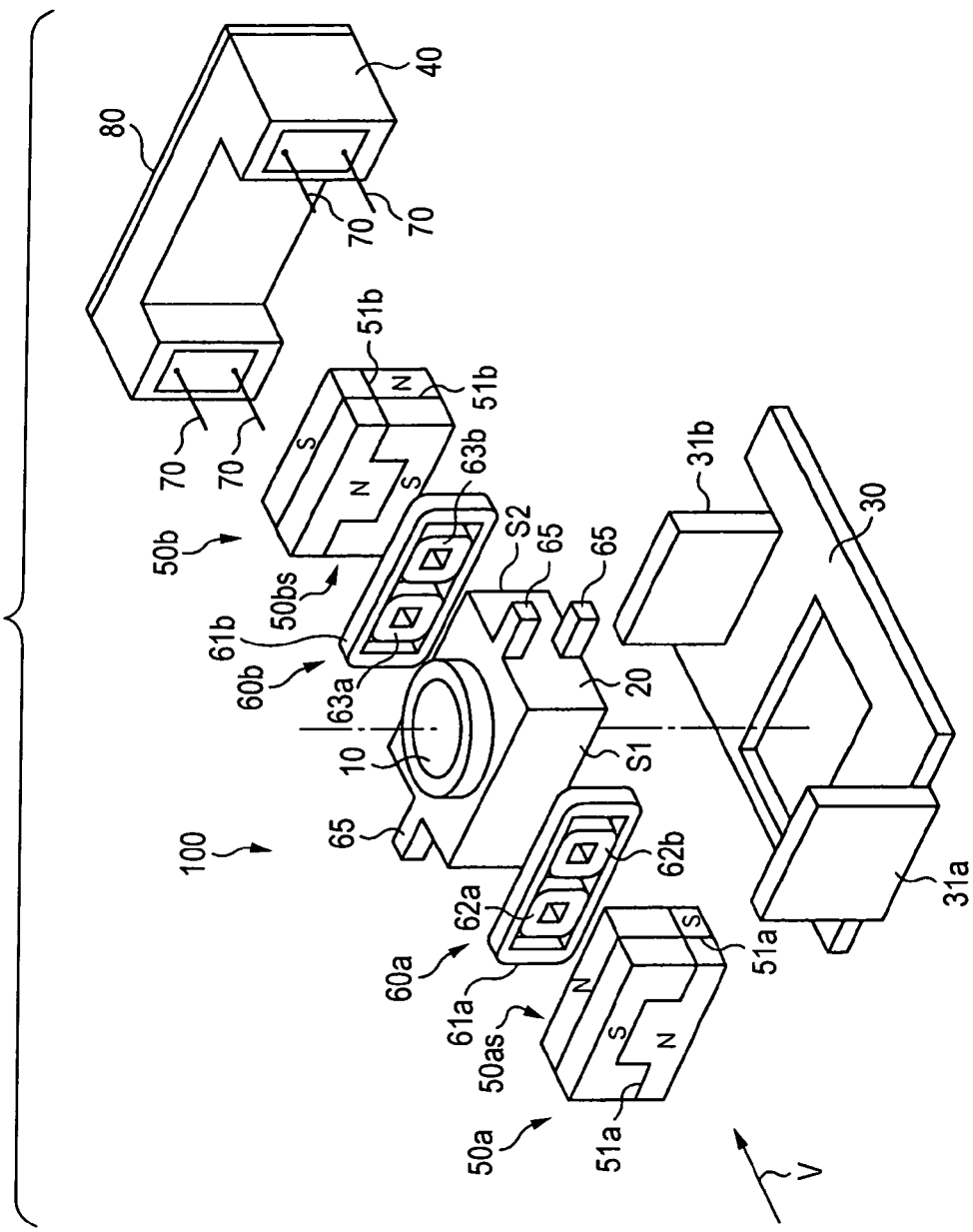
FIG. 1 is an exploded perspective view showing a construction of an objective lens drive unit for an optical head device according to a first embodiment of the invention.

Referring now to FIGS. 1 to 4, an optical head device according to the first embodiment will be described. FIG. 1 is an exploded perspective view showing a construction of an objective lens drive unit for an optical head device according to the first embodiment. The objective lens drive unit shown in FIG. 1 includes a coil and a magnet disposed on both sides of an objective lens 10, respectively, in the tangential direction of the optical recording medium so that the objective lens can be driven with a high degree of sensitivity.

As shown in FIG. 1, the objective lens 10, which faces an information recording surface of an optical recording medium (not shown) for recording or reproducing the information by focusing an optical beam and irradiating on the information recording surface of the optical recording medium, is held by a lens holder 20. The lens holder 20 is formed, for example, of a resin material, such as liquid crystal polymer, or the like. Various engineering plastics may be used as a material for forming the lens holder 20 as long as a desired molding property and rigidity are secured.

The lens holder 20 in FIG. 1 is provided with a coil unit 60a adhered on a left side surface S1 thereof by an adhesive agent or the like, and a coil unit 60b adhered on a right side surface S2, which opposes the left side surface S1 in substantially parallel therewith. The lens holder 20 is formed substantially symmetrically with respect to a plane including an optical axis of the objective lens 10 and being parallel with the left and the right side surfaces S1 and S2, and is also formed substantially symmetrically with respect to a plane including the optical axis of the optical lens 10 and intersecting with the left and the right side surfaces S1 and S2. The coil units 60a and 60b are also formed substantially symmetrically with respect to the planes described above. Therefore, the lens holder 20 and the coil units 60a and 60b adhered on both side surfaces of the lens holder 20 are integrated, and the center of gravity of a movable unit 100 including the objective lens 10 is located on the optical axis of the objective lens 10 in the lens holder 20.

The coil units 60a and 60b have focus coils 61a ad 61b, which are wound into, for example, a rectangular shape and connected in series, respectively. The focus coils 61a and 61b are wound so as to generate the substantially same forces in the focusing direction when being energized. The coil unit 60a is provided with two tracking coils 62a and 62b disposed in parallel along the longer side of the focus coil 61a and connected in series inwardly of the focus coil 61a. The coil unit 61b is provided with two tracking coils 63a and 63b disposed in parallel along the longer side of the focus coil 61b and connected in series inwardly of the focus coil 61b. The tracking coils 62a and 62b and the tracking coils 63a and 63b are connected in series. The tracking coils 62a, 62b, 63a and 63b are wound so as to generate the substantially same forces in the tracking direction when being energized.

The lens holder 20 includes four wire wound coil-connecting portions 65. One of these wire wound coil-connecting portions 65 is connected to one terminal of the focus coils 61a and 61b connected in series via a leading portion of a wire wound coil (not shown), and another wire wound coil-connecting portion 65 is connected to the other terminal of the focus coils 61a and 61b via a leading portion of a wire wound coil (not shown).

Still another wire wound coil-connecting portion 65 is connected to one terminal of the tracking coils 62a, 62b, 63a, and 63b connected in series via the wire wound coil leading portion (not shown), and still another wire wound coil-connecting portion 65 is connected to the other terminal of the tracking coils 62a, 62b, 63a, and 63b via a leading portion of a wire wound coil (not shown). Each wire wound coil-connecting portion 65 is connected to one end of each of four conductive elastic bodies 70 by soldering or the like. The lens holder 20 supported by four conductive elastic bodies 70 and the coil units 60a and 60b adhered on both side surfaces of the lens holder 20 are integrated and constitute the movable portion 100 including the objective lens 10.

The focus coil 61a and 61b, and the tracking coils 62a, 62b, 63a, and 63b may be formed by providing winding frames for the focus coils 61a and 61b, and the tracking coils 62a, 62b, 63a, and 63b, respectively, on both side surfaces S1 and S2 of the lens holder 20 and winding on the respective winding frames. The coil units 60a and 60b may not be wound wires as described above, but maybe constructed of substantially rectangular flat substrates including one focus coil and two tracking coils, which are patterned conductive bodies, for example, which are adhered both side surfaces of the lens holder 20, as a mater of course. The coil unit to be adhered on the both side surfaces of the lens holder 20 may have various constructions such as a combination of the coil unit as shown in FIG. 1 and a coil unit having a winding frame described above, or a combination with a coil unit having flat substrates.

The other end of the conductive elastic body 70 is fixedly soldered to a base substrate 80. Accordingly, the movable portion 100 is cantilevered so as to be movable with respect to a stationary portion including a yoke base 30, two yokes 31a and 31b, a wire base 40, two magnets 50a and 50b, and the base substrate 80.

The coil unit 60a is disposed in a magnet circuit formed by the magnet 50a adhered on the yoke 31a on the yoke base 30. The coil unit 60b is disposed in the magnet circuit formed by the magnet 50b adhered to the yoke 31b on the yoke base 30.

The coil surface of the coil unit 60a is disposed so as to face one magnetized surface 50as of the magnet 50a. The magnet 50a, which is substantially rectangular solid, is bipolarized; one in a recessed area recessed on the bottom and the other in a projected area projected upward and fitted to the recess, as shown by an image line 51a, which represents a magnetic boundary. In this example, the recessed area facing the coil unit 60a is magnetized in the N-Pole, and the projected area is magnetized in the S-Pole.

The coil surface of the coil unit 60n is disposed so as to face one magnetized surface 50bs of the magnet 50b. The magnet 50b, which is substantially rectangular solid, is bipolarized; one in a recessed area recessed on the upper surface and the other in a projected area projected downward and fitted to the recess, as shown by an image line 51a, which represents a magnetic boundary. In this example, the recessed area facing the coil unit 60a is magnetized in S pole, and the projected area is magnetized in the N-Pole.

The magnet 50a and the magnet 50b may be magnets of the same specifications, fabricated in the same process flow. When the magnet 50a is rotated by 180° about the direction indicated by an arrow V in FIG. 1, the magnet 50a will be the same magnetized state as the magnet 50b. The bipolarization may be realized by combining two magnetized magnets, in addition to the method of bipolarizing one magnet as described above.

Figure 2A:
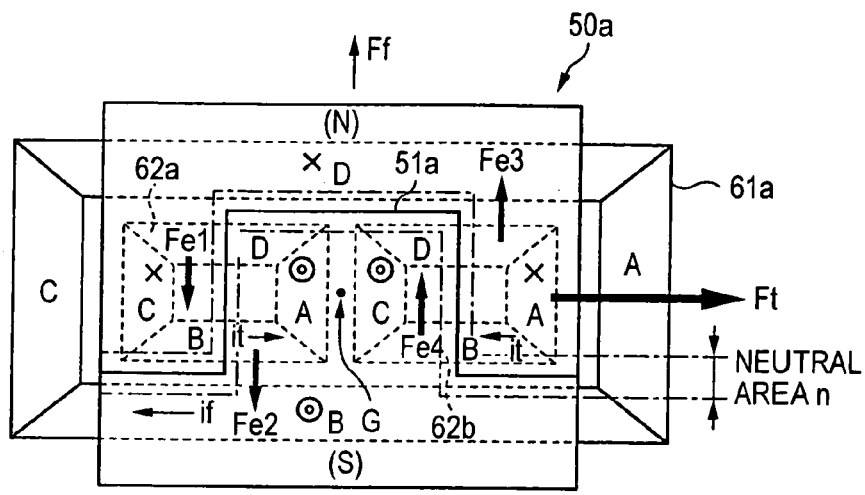
FIGS. 2A and 2B are drawings showing magnetization of magnets and layout of focus coils and tracking coils in the optical head device according to the first embodiment of the invention.

Subsequently, referring to FIGS. 2A and 2B, the magnetized areas of the magnets 50a and 50b, and the positional relationship among the focus coils 61a and 61b, and the tracking coils 62a, 62b, 63a, and 63b in the optical head device of this embodiment will be described. FIG. 2A shows a positional relation between the magnet 50a and the coil unit 60a when viewing the lens holder 20 in the direction indicated by the arrow V in FIG. 1. In FIG. 2A, the magnet 50a is positioned on the near side with respect to the coil unit 60a. As described already above, the recessed area of the magnet 50a facing the coil unit 60a is magnetized in the N-Pole, and the projected area is magnetized in the S-Pole As shown in FIG. 2A, the focus coil 61a is wound into a rectangular shape. Two tracking coils 62a and 62b are disposed inside the focus coil 61a. The tracking coils 62a and 62b are wound into a rectangular shape.

One longer side of the focus coil 61a opposes only one magnetized area of the opposed surface of the magnet 50a, and the other longer side thereof opposed to the one longer side faces only the other magnetized area thereof. For the sake of convenience, when the four sides of the rectangular focus coil 61a are divided into areas A, B, C, and D, as sown in FIG. 2A, the side B of the focus coil 61a is disposed at the position facing the S-Pole of the magnet 50a, so that a magnetic flux travels in the direction from the surface of the drawing toward the near side (shown by a double-circle in the drawing). The side D opposing the side B is disposed at the position facing the N-Pole, so that a magnetic flux travels in the direction from the near side toward the surface of the drawing (shown by a cross in the drawing). The side A and the side C of the focus coil 61a are disposed at the positions not facing the magnet 50a.

The four sides of the rectangular tracking coils 62a and 62b are, as in the case of the focus coil 61a, is also divided imaginarily into areas A, B, C, and D, as shown in FIG. 2A. The side A, which is a shorter side of the tracking coil 62a, is disposed at the position facing the S-Pole of the magnet 50a, so that a magnetic flux travels in the direction from the surface of the drawing toward the near side (shown by a double-circle in the drawing). The side C, which is the other shorter side facing the side A is disposed at the position facing the N-Pole, so that a magnetic flux travels in the direction from the near side toward the surface of the drawing (shown by a cross in the drawing). The side B and the side D of the tracking coil 62a are disposed at the positions crossing over the N-Pole and the S-Pole of the magnet 50a.

On the other hand, the side A, which is a shorter side of the tracking coil 62b, is disposed at the position facing the N-Pole of the magnet 50a, so that a magnetic flux travels in the direction from the near side toward the surface of the drawing (shown by a cross in the drawing). The side C, which is the other shorter side opposing the side A, is disposed at the position facing the S-Pole, so that a magnetic flux travels from the surface of the drawing to the near side (shown by a double-circle in the drawing). The side B and the side D of the tracking coil 62b are disposed at the positions crossing over the N-Pole and the S-Pole of the magnet 50a.

The tracking coils 62a and 62b are wound in such a manner that the direction of a current flowing along the side A of one tracking coil 62a is opposite from the direction of a current flowing along the side A of the other tracking coil 62b.

Figure 2B:
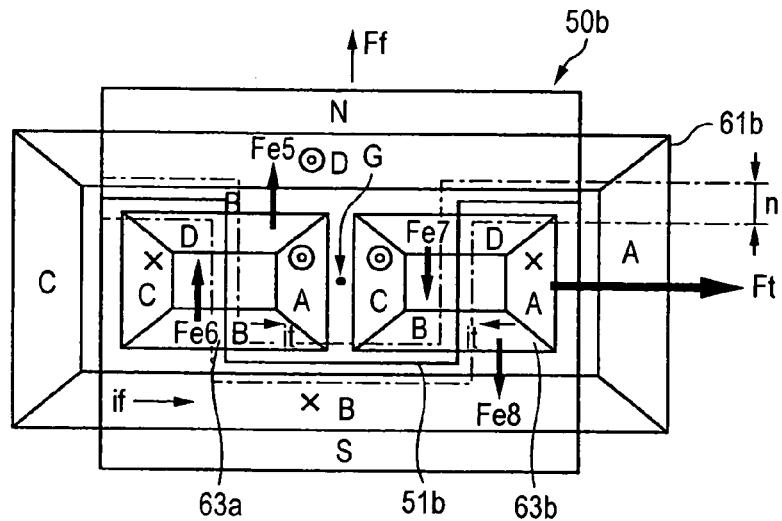

FIG. 2B shows a positional relationship between the magnet 50b and the coil unit 60b when viewing the lens holder 20 in the direction indicated by the arrow V in FIG. 1. In FIG. 2B, the magnet 50b is positioned on the further side with respect to the coil unit 60b. As described already above, the recessed area facing the coil unit 60b is magnetized in the S-Pole, and the projected area is magnetized in the N-Pole. As shown in FIG. 2B, the focus coil 61b is wound in a rectangular shape. The two tracking coils 63a and 63b are disposed inside the focus coil 61b. The tracking coils 63a and 63b are wound into a rectangular shape.

One longer side of the focus coil 61b opposes only one magnetized area of the opposing surface of the magnet 50b, and the other longer side opposing the longer side opposes only the other magnetized area. The four sides of the rectangular focus coil 61b are imaginarily divided into the areas A, B, C, and D, as shown in FIG. 2B, the side B of the focus coil 61b is disposed at the position facing the S-Pole of the magnet 50b, so that a magnetic flux travels in the direction from the near side to the surface of the drawing (shown by a cross in the drawing). The side D opposing the side B is disposed at the position facing the N-Pole, so that a magnetic flux travels in the direction from the surface of the drawing toward the near side (shown by a double-circle in the drawing). The side A and the side C of the focus coil 61b are disposed at the position not facing the magnet 50b.

The four sides of the rectangular tracking coils 63a and 63b are imaginarily divided into areas A, B, C and D, as shown in FIG. 2B, as in the case of the focus coil 61b. The side A, which is one shorter side of the tracking coil 63a, is disposed at the position facing toward the N-Pole of the magnet 50b, so that a magnetic flux travels in the direction from the surface of the drawing toward the near side (shown by a double-circle in the drawing). The side C, which is the other shorter side opposing the side A, is disposed at the position facing the S-Pole, so that a magnetic flux travels in the direction from the near side toward the surface of the drawing (shown by a cross in the drawing). The side B and the side D of the tracking coil 63a are disposed at the positions crossing over the N-Pole and the S-Pole of the magnet 50b.

On the other hand, the side A, which is a shorter side of the tracking coil 63b, is disposed at the position facing the S-Pole of the magnet 50b, so that a magnetic flux travels in the direction from the near side toward the surface of the drawing (shown by a cross in the drawing). The side C, which is the other shorter side opposing the side A, is disposed at the position facing the N-Pole, so that a magnetic flux travels in the direction from the surface of the drawing toward the near side (shown by a double-circle in the drawing). The side B and the side D of the tracking coil 63b are disposed at the positions crossing over the N-Pole and the S-Pole of the magnet 50b.

The tracking coils 63a and 63b are wound in such a manner that the direction of a current flowing along the side A of one tracking coil 63a is opposite from the direction of a current flowing along the side A of the other tracking coil 63b. Although these drive coils 61a, 61b, 62a, 62b, 63a, and 63b are wound into a rectangular shape in this example, they may be wound into a circular shape, oval shape, or polygonal shape, as a matter of course.

When the coil surface of the optical head device having the objective lens drive unit of such a construction is disposed in substantially parallel with the radial direction of the optical disk, and the focus coils 61a and 61b, and the tracking coils 62a, 62b, 63a, and 63b in the coil units 60a and 60b are energized, a force acting on the coil according to the Fleming's left hand rule is generated, and thus the lens holder 20 can be moved in desired directions. When the focus coils 61a and 61b are energized, a driving force for moving the side B and the side D in the focusing direction (vertical direction in FIGS. 2A and 2B) is generated, and when the tracking coils 62a, 62b, 63a, and 63b are energized, a driving force for moving the side A and the side C in the tracking direction (lateral direction in FIGS. 2A and 2B) is generated.

For example, as shown in FIGS. 2A and 2B, when a current flows through the focus coils 61a and 61b in the direction indicated by an arrow if, a force Ff directing upward in the drawing is generated. Accordingly, the objective lens 10 can be moved corresponding to the fluctuation of the surface of the optical disk. For example, the objective lens 10 can be moved by the focus coils 61a and 61b in the direction substantially vertical to the information recording surface of the optical disk to adjust a focusing position.

As shown in FIGS. 2A and 2B, when a current flows in the tracking coils 62a, 62b, 63a, and 63b in the direction indicated by an arrow it, a force Ft acting toward the right in the drawing is generated. Accordingly, the objective lens 10 can be moved corresponding to eccentricity of the optical disk. For example, the tracking position can be adjusted by moving the objective lens 10 radially of the optical disk by the tracking coils 62a, 62b, 63a, and 63b.

In the objective lens drive unit of the optical head device having the construction described thus far according to this embodiment, a driving action in a case in which part of any sides of the tracking coils 62a, 62b, 63a, and 63b are included in the neutral areas n formed in the vicinity of magnetic boundaries 51a and 51b will be described. In FIGS. 2A and 2B, the point G indicates a center of gravity of the movable portion 100. The center of gravity of the movable portion 100 is positioned at substantially center of the coil units 60a and 60b.

As shown in FIG. 2A, the left portion of the side B and the right portion of the side D of the tracking coil 62a and the right portion of the side B and the left portion of the side D of the tracking coil 62b are included in the neutral area n in the vicinity of the magnetic boundaries 51a of the magnet 50a. Therefore, when an attempt is made to move the movable portion 100 toward the right in FIG. 2, for example, by energizing the tracking coils 62a, 62b, 63a, and 63b, an upward force, which is generated at the left portion of the side B of the tracking coil 62a (included in the neutral area n), is smaller than a downward force, which is generated on the left portion of the side D of the tracking coil 62a, whereby a relatively downward force Fe1 is generated. Likewise, a downward force, which is generated on the right portion of the side B of the tracking coil 62a, is larger than an upward force, which is generated in the right portion of the side D of the tracking coil 62a (included in the neutral area n), whereby a relatively downward force Fe2 is generated. Therefore, in FIG. 2A, when the tracking coil 62a is energized, a downward force, as well as a force to move the lens holder 20 rightward, is generated.

In the same manner, a downward force, which is generated in the right portion of the side B of the tracking coil 62b (included in the neutral area n), is smaller than a upward force, which is generated on the right portion of the side D of the tracking coil 62b, whereby a relatively upward force Fe3 is generated. Likewise, an upward force, which is generated in the left portion of the side B of the tracking coil 62b, is larger than a downward force, which is generated in the left portion of the side D of the tracking coil 62b (included in the neutral area n), whereby a relatively upward force Fe4 is generated. Therefore, in FIG. 2A, when the tracking coil 62b is energized, an upward force, as well as a force to move the lens holder 20 rightward, is generated.

Therefore, a moment for rotating the lens holder 20 counterclockwise when viewed in the direction indicated by the arrow V in FIG. 1 is generated from the coil unit 60a.

On the other hand, as shown in FIG. 2B, the right portion of the side B and the left portion of the side D of the tracking coil 63a and the left portion of the side B and the right portion of the side D of the tracking coil 63b are included in the neutral area n in the vicinity of the magnetic boundary 51*b* of the magnet 50*b*. Therefore, for example, when an attempt is made to move the movable portion 100 toward the right in FIG. 2 by energizing the tracking coils 62*a*, 62*b*, 63*a*, and 63*b*, a downward force, which is generated in the right portion of the side B of the tracking coil 63*a* (included in the neutral area n), is smaller than an upward force, which is generated on the right portion of the side D of the tracking coil 63*a*, whereby a relatively upward force Fe5 is generated. Likewise, the upward force, which is generated on the left portion of the side B of the tracking coil 63*a*, is larger than a downward force, which is generated on the left portion of the side D of the tracking coil 63*a* (included in the neutral area n), whereby a relatively upward force Fe6 is generated. Therefore, in FIG. 2B, when the tracking coil 63*a* is energized, an upward force, as well as a force to move the lens holder 20 rightward, is generated.

In the same manner, an upward force, which is generated on the left portion of the side B of the tracking coil 63*b* (included in the neutral area n), is smaller than the downward force, which is generated on the left portion of the side D of the tracking coil 63*b*, whereby the relatively downward force Fe7 is generated. Likewise, a downward force, which is generated on the right portion of the side B of the tracking coil 63*b*, is larger than the upward force, which is generated on the right portion on the side D of the tracking coil 63*b* (included in the neutral area n), whereby a relatively downward force Fe8 is generated. Therefore, when the tracking coil 63*b* is energized, a downward force, as well as a force to move the lens holder 20, is generated.

Therefore, a moment for rotating the lens holder 20 clockwise when viewed in the direction indicated by the arrow V in FIG. 1 is generated from the coil unit 60*b*.

In this embodiment, since the magnetized pattern on the surface of the magnet 50*a* opposing the coil unit 60*a* and the magnetized pattern on the surface of the magnet 50*b* opposing the coil unit 60*b* are oriented in the opposite directions, and thus the portions of the sides B and the sides D, which are included in the neutral areas n (or the portions near the neutral areas n) of the tracking coils 62*a* and 62*b*, and the portions of the sides B and the sides D, which are included in the neutral areas n (or the portions near the neutral areas n) of the tracking coils 63*a* and 63*b* are laterally mirror opposites.

The tracking coils 62*a*, 62*b*, 63*a* and 63*b* generate almost the same driving force with each other, the direction of the moment generated by the coil unit 60*a* is opposite from the direction of a moment generated by 60*b*, and the magnitudes are substantially the same. Therefore, the movable portion 100 is capable of moving by a predetermined extent only in the tracking direction without being rotated, inclined or shifted in the focusing direction, since the both moments cancels each other out. The percentage of the portion included in the neutral area n varies as moved in the tracking direction, and the magnitude of the moment varies accordingly. However, since the amounts of variation in moment of the coil units 60*a* and 60*b* are equal, the both moments cancel each other out into zero, and the movable portion 100 can be moved only in the tracking direction.

As described above, according to this embodiment, even when any of the sides of the tracking coils are partly included in the neutral areas n in the vicinity of the magnetic boundaries 51*a* and 51*b*, an unnecessary force in the focusing direction is not generated, and a moment of rotation relating to a center of gravity of the movable portion 100 is prevented from being generated.

As regards the focus coils 61*a* and 61*b*, although any of the sides B and the sides D are partly included in the neutral areas n, since forces, which are almost the same as forces generated at arbitrary points on the side B of the focus coil 61*a* in terms of direction and magnitude, are produced at corresponding points on the side D of the focus coil 61*b*, and forces, which are almost the same as forces generated at arbitrary points on the side D of the focus coil 61*b* in terms of direction and magnitude, are produced at corresponding points on the side B, an unnecessary moment will not be generated.

In this manner, the objective lens drive unit of the optical head device according to this embodiment is characterized in that there are provided two driving force generating units, including two magnets 50*a* and 50*b* disposed in the tangential direction of the optical disk separately on the opposite sides of the objective lens 10, and the coil units 60*a* and 60*b* for generating the driving force directed against the magnets 50*a* and 50*b* disposed on the lens holder 20, and in that the magnets 50*a* and 50*b* and the coil units 60*a* and 60*b* are arranged in such a manner that the driving force other than the driving force generated for tracking movement and the moment act against each other in the two driving force generating units.

The objective lens drive unit of the optical head device according to this embodiment is characterized in that there are provided two driving force generating units, including two magnets 50*a* and 50*b* disposed in the tangential direction of the optical disk separately on the opposite sides of the objective lens 10, and the coil units 60*a* and 60*b* for generating the driving force directed against the magnets 50*a* and 50*b* disposed on the lens holder 20, and in that the magnets 50*a* and 50*b* and the coil units 60*a* and 60*b* are arranged in such a manner that the driving force other than the driving force generated for focusing movement and the moment act against each other in the two driving force generating units. Therefore, an optical head device of this embodiment, in which the thickness of the movable portion 100 in the focusing direction is reduced, can be realized.

Figure 3:
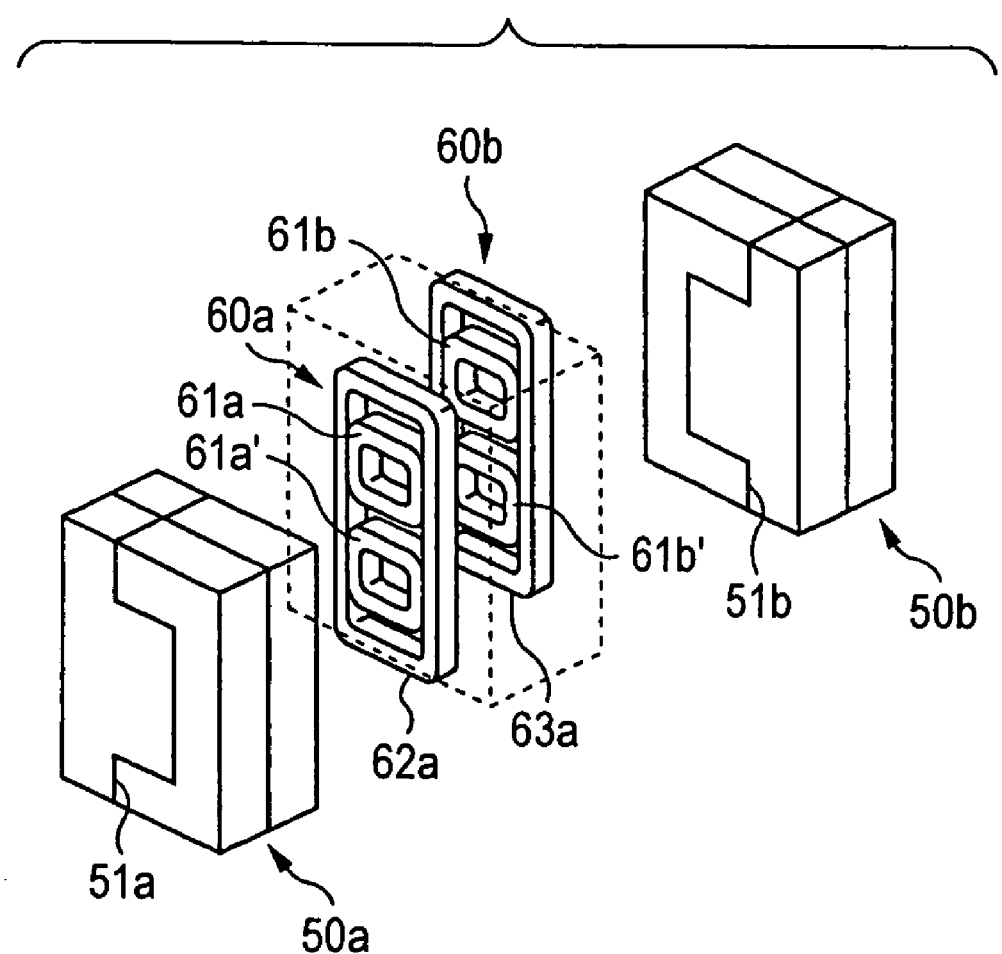
FIG. 3 is a drawing showing magnetization of magnets and layout of focus coils and tracking coils in another optical head device according to the first embodiment of the invention.

Subsequently, referring to FIG. 3 and FIG. 4, a modification of the objective lens drive unit for an optical head device according to this embodiment will be described. FIG. 3 is an example in which the magnets 50*a* and 50*b* and the coil units 60*a* and 60*b* shown in FIG. 1 and FIG. 2 are rotated from landscape to portrait by 90°. In this example, rectangular coils on the outside serve as the tracking coils 62*a* and 63*a*, and the inner two rectangular coils serve as the focus coils 61*a* and 61*b*.

FIG. 4 shows a positional relationship among the magnetized areas of the magnets 50*a* and 50*b*, the focus coils 61*a*, 61*a*' and 61*b*, 61*b*' and the tracking coils 62*a* and 63*a* in the optical head device in this modification. FIG. 4A shows a positional relationship between the magnet 50*a* and the coil unit 60*a* when viewing the lens holder 20 in the direction indicated by the arrow V in FIG. 1. In FIG. 4A, the magnet 50*a* is positioned on the near side with respect to the coil unit 60*a*. The recessed area of the magnet 50*a* facing the coil unit 60*a* is magnetized in the N-Pole and the projected area is magnetized in the S-Pole. As shown in FIG. 4A, two focus coils 61*a* and 61*a*', which are wound in a rectangular shape, respectively, are disposed one above the other. The tracking coil 62*a* is disposed so as to enclose the two focus coils 61*a* and 61*a*'. The tracking coil 62*a* is also wound in a rectangular shape.

When the four sides of the two rectangular focus coils 61*a* and 61*a*' are imaginarily divided into areas A, B, C, and D, as shown in FIG. 4A, the side B of the focus coil 61*a* is located at the position facing the S-Pole of the magnet 50*a*, so that a magnetic flux travels in the direction from the surface of the drawing toward the near side (shown by a double-circle in the drawing). The side D opposing the side B is located at the position facing the N-Pole, so that a magnetic flux travels in the direction from the near side toward the surface of the drawing (shown by a cross in the drawing). The side A and the side C of the focus coil 61*a* are disposed at the positions crossing over the N-Pole and the S-Pole of the magnet 50*a*.

On the other hand, the side B of the focus coil 61*a*' is disposed at the position facing the N-Pole of the magnet 50*a*, so that a magnetic flux travels in the direction from the near side toward the surface of the drawing (shown by a cross in the drawing). The side D opposing the side B is located at the position facing the S-Pole, so that a magnetic flux travels in the direction from the surface of the drawing toward the near side (shown by a double-circle in the drawing). The side A and the side C of the focus coil 61*a*' are located at the positions crossing over the N-Pole and the S-Pole of the magnet 50*a*.

When imaginarily dividing four sides of the rectangular tracking coil 62*a* into areas A, B, C and D as shown in FIG. 4A in the same manner as the focus coils 61*a* and 61*a*', the side C, which is a loner side of the tracking coil 62*a* is located at the position facing the S-Pole of the magnet 50*a*, so that a magnetic flux travels in the direction from the surface of the drawing toward the near side (shown by a double-circle in the drawing). The other longer side A opposing the side C is disposed at the position facing the N-Pole, so that a magnetic flux travels in the direction from the near side toward the surface of the drawing (shown by a cross in the drawing). The side B and the side D of the tracking coil 62*a* are disposed at the positions not facing the magnet 50*a*.

The respective focus coils 61*a* and 61*a*' are wound in such a manner that the direction of a current flowing through the side A of the focus coil 61*a* on one side is opposite from the direction of a current flowing through the side A of the focus coil 61*a*' on the other side.

FIG. 4B shows a relational relationship of the magnet 50*b* and the coil unit 60*b* when viewing the lens holder 20 in the direction indicated by the arrow V in FIG. 1. In FIG. 4B, the magnet 50*b* is disposed on the far side with respect to the coil unit 60*b*. The recessed area facing the coil unit 60*b* is magnetized in the S-Pole, and the projected area is magnetized in the N-Pole. As shown in FIG. 4B, the two focus coils 61*b*, 61*b*' are wound in a rectangular shape and disposed one above the other. The tracking coil 63*a* is disposed so as to enclose the two focus coils 61*b*, 61*b*'. The tracking coil 63*a* is also wound into a rectangular shape.

When the two rectangular focus coils 61*b* and 61*b*' are imaginary divided into areas A, B, C, and D in FIG. 4B, the side B of the focus coil 61*b* is disposed at the position facing the N-Pole of the magnet 50*b*, so that a magnetic flux travels in the direction from the surface of the drawing toward the near side (shown by a double-circle in the drawing). The side D opposing the side B is disposed at the position facing the S-Pole, so that a magnetic flux travels in the direction from the near side toward the surface of the drawing (shown by a cross in the drawing). The side A and the side C of the focus coil 61*b* are disposed at the positions crossing over the N-Pole and the S-Pole of the magnet 50*b*.

On the other hand, the side B of the focus coil 61*b*' is disposed at the position facing the S-Pole of the magnet 50*b*, so that a magnetic flux travels in the direction from the near side toward the surface of the drawing (shown by a cross in the drawing). The side D opposing the side B is disposed at the position facing the N-Pole, so that a magnetic flux travels in the direction from the surface of the drawing toward the near side (shown by a double-circle in the drawing) The side A and the side C of the focus coil 61*b*' are disposed at the positions crossing over the N-Pole and the S-Pole of the magnet 50*b*.

When the four sides of the rectangular tracking coil 63*a* are also imaginarily divided into areas A, B, C, and D as shown in FIG. 4B as in the case of the focus coils 61*b* and 61*b*', the side C, which is a longer side of the tracking coil 63*a*, is disposed at the position facing the S-Pole of the magnet 50*b*, so that a magnetic flux travels in the direction from the near side toward the surface of the drawing (shown by a cross in the drawing). The other longer side A opposing the side C is disposed at the position facing the N-Pole, so that a magnetic flux travels in the direction from the surface of the drawing toward the near side (shown by a double-circle in the drawing) The side B and the side D of the tracking coil 63*a* are disposed at the position not facing the magnet 50*b*.

The focus coil 61*b* and 61*b*' are wound in such a manner that the direction of a current flowing through the side A of the focus coil 61*b* is opposite from the direction of a current flowing through the side A of the focus coil 61*b*'.

When the coil surface of the optical head device having the objective lens drive unit of such a construction is disposed in substantially parallel with the radial direction of the optical surface, and the focus coils 61*a*, 61*a*' and 61*b*, 61*b*', and the tracking coils 62*a* and 63*a* in the coil units 60*a* and 60*b* are energized, a force acting on the coil according to the Fleming's left hand rule is generated, and thus the lens holder 20 can be moved in desired directions. When the focus coils 61*a*, 61*a*' and 61*b*, 61*b*' are energized, a driving force for moving the side B and the side D in the focusing direction (vertical direction in FIGS. 4A and 4B) is generated, and when the tracking coils 62*a* and 63*a* are energized, a driving force for moving the Side A and the side C in the tracking direction (lateral direction in FIGS. 4A and 4B) is generated.

For example, as shown in FIGS. 4A and 4B, when a current is flown through the focus coils 61*a*, 61*a*' and 61*b*, 61*b*' in the direction indicated by the arrow if, the force Ff directing downward in the drawing is generated. Accordingly, the objective lens 10 can be moved corresponding to the fluctuation of the surface of the optical disk. For example, the objective lens 10 can be moved by the focus coils 61*a*, 61*a*' and 61*b*, 61*b*' in the direction substantially vertical to the information recording surface of the optical disk to adjust a focusing position.

As shown in FIGS. 4A and 4B, when a current is flown in the tracking coils 62*a* and 63*a* in the direction indicated by the arrow it, the force Ft acting toward the right in the drawing is generated. Accordingly, the objective lens 10 can be moved corresponding to eccentricity of the optical disk. For example, the tracking position can be adjusted by moving the objective lens 10 radially of the optical disk by the tracking coils 62*a* and 63*a*.

In the objective lens drive unit of the optical head device having the construction described thus far according to this embodiment, a driving action in a case in which part of any sides of the focus coils 61*a*, 61*a*' and 61*b*, 61*b*' are included in the neutral areas n formed in the vicinity of magnetic boundaries 51*a* and 51*b* will be described. The point G indicates a center of gravity of the movable portion 100 in FIGS. 4A and 4B. The center of gravity of the movable portion 100 is positioned at substantially center of each of the coil units 60*a* and 60*b*.

As shown in FIG. 4A, the lower portion of the side A and the upper portion of the side C, and the upper portion of the side A and the lower portion of the side C of the focus coil 61a' are included in the neutral area n in the vicinity of the magnetic boundary 51a of the magnet 50a. Therefore, when an attempt is made to move the movable portion 100 downward in FIG. 4, for example, by energizing the focus coils 61a, 61a' and 61b, 61b', a leftward force generated on the upper portion of the side A of the focus coil 61a is larger than a rightward force generated on the upper portion of the side C of the focus coil 61a (included in the neutral area n), whereby a relatively leftward force Fe1 is generated. Likewise, a rightward force, which is generated on the lower portion of the side A of the focus coil 61a, is smaller than a leftward force generated on the lower portion of the side C of the focus coil 61a (included in the neutral area n), whereby a relatively leftward force Fe2 is generated. Therefore, in FIG. 4A, when the focus coil 61a is energized, a leftward force, as well as a force to move the lens holder 20 downward, is generated.

In the same manner, a leftward force, which is generated on the lower portion of the side C of the focus coil 61a' (included in the neutral arean), is smaller than a rightward force generated on the lower portion of the side A of the focus coil 61a', whereby a relatively rightward force Fe3 is generated. Likewise, a rightward force, which is generated on the upper portion of the side C of the focus coil 61a' is larger than a leftward force generated in the upper portion of the side A of the focus coil 61a' (included in the neutral area n), whereby a relatively rightward force Fe4 is generated. Therefore, in FIG. 4A, when the focus coil 61a' is energized, a leftward force, as well as a force to move the lens holder 20 downward, is generated.

Therefore, a moment for rotating the lens holder 20 counterclockwise when viewing in the direction indicated by the arrow V in FIG. 1 is generated from the coil unit 60a.

On the other hand, as shown in FIG. 4B, the upper portion of the side A and the lower portion of the side C of the focus coil 61b, and the lower portion of the side A and the upper portion of the side C of the focus coil 61b' are included in the neutral area n in the vicinity of the magnetic boundary 51b of the magnet 50b. Therefore, for example, when an attempt is made to move the movable portion 100 downward in FIG. 4B by energizing the focus coils 61a, 61a' and 61b, 61b', a leftward force, which is generated on the lower portion of the side C of the focus coil 61b (included in the neutral area n), is smaller than a rightward force, which is generated on the lower portion of the side A of the focus coil 61b, whereby a relatively rightward force Fe5 is generated. Likewise, a rightward force, which is generated on the upper portion of the side C of the focus coil 61b is larger than a leftward force generated on the upper portion of the side A of the focus coil 61b (included in the neutral area n), whereby a relatively rightward force Fe6 is generated. Therefore, in FIG. 4B, when the focus coil 61b is energized, a rightward force, as well as a force to move the lens holder 20 downward, is generated.

In the same manner, a rightward force, which is generated on the upper portion of the side C of the focus coil 61b' (included in the neutral area n) is smaller than a leftward force, which is generated on the upper portion of the side A of the focus coil 61b', and a relatively leftward force Fe7 is generated. Likewise, a leftward force, which is generated on the lower portion of the side C of the focus coil 61b', is larger than a rightward force, which is generated on the lower portion of the side A of the focus coil 61b' (included in the neutral area n), whereby a relatively leftward force Fe8 is generated. Therefore, in FIG. 4B, when the focus coil 61b' is energized, a leftward force, as well as a force to move the lens holder 20 downward, is generated.

Therefore, a moment for rotating the lens holder clockwise when viewing in the direction indicated by the arrow V in FIG. 1 is generated from the coil unit 60b.

Since the focus coils 61a, 61a' and 61b, and 61b' generate the substantially same driving force, a moment generated at the coil unit 60a is opposite from the direction of a moment generated at the coil unit 60b, and the magnitudes are substantially the same. Therefore, the movable portion 100 can be moved by a predetermined extent only in the focusing direction without being rotated, inclined, and shifted in the tracking direction, since both moments cancel each other out. The percentage of the portion included in the neutral area n varies as moved in the focusing direction, and the magnitude of the moment varies accordingly. However, since the amounts of variation in moment of the coil units 60a and 60b are equal, the both moments cancel each other out into zero, and the movable portion 100 can be moved only in the focusing direction.

As described above, according to the construction of this modification, even when any sides of the focus coils are partly included in neutral areas n in the vicinity of the magnetic boundaries 51a and 51b, an unnecessary force in the tracking direction is prevented from being generated, and a moment of rotation relating to a center of gravity of the movable portion 100 is prevented from being generated.

As regards the tracking coils 62a and 62b, although any of sides A and the sides C are partly included in the neutral areas n, since forces, which are almost the same as forces generated at arbitrary points on the side A of the tracking coil 62a in terms of direction and magnitude, are produced at corresponding points on the side C of the tracking coil 63a, and forces, which are almost the same as forces generated at arbitrary points on the side C of the tracking coil 62a in terms of direction and magnitude, are produced at corresponding points on the side A, an unnecessary moment will not be generated. Therefore, according to this modification, an optical head device, in which the thickness of the movable unit 100 in the tracking direction is reduced, is achieved.

[Second Embodiment]

Referring now to FIG. 5, an optical head device according to the second embodiment of the invention will be described. An objective lens drive unit of the optical head device according to this embodiment has a similar construction to that shown in FIG. 1 in conjunction with the first embodiment, except for the construction of the coil units 60a and 60b and the magnets 50a and 50b. FIG. 5 shows a positional relationship among the magnetic areas of the magnets 50a and 50b, the focus coils 61a, 61b, and the tracking coils 62a and 63a according to the optical head device of this embodiment.

The coil units 60a and 60b have, for example, the focus coils 61a and 61b wound into a rectangular shape and connected in series, respectively. The focus coils 61a and 61b are wound in such a manner that the substantially same forces are produced, in the focusing direction when being energized. The tracking coil 62a is provided inwardly of the focus coil 61a of the coil unit 60a. The tracking coil 63a is provided inwardly of the focus coil 61b of the coil unit 60b. The tracking coil 62a and the tracking coil 63a are connected in series. The tracking coils 61a and 63a are wound in such a manner that the substantially same forces are produced in the tracking direction when being energized.

The magnet 50a, which is substantially, is bipolarized into two L-shaped areas as shown by the image line 51a, which represents the magnetic boundary. In this example, the lower L-shaped area facing the coil unit 60a (lower side in FIG. 5) is magnetized in the S-Pole, and the upper L-shaped area facing the same is magnetized in the N-Pole.

The magnet 50b, which is substantially rectangular solid, is bipolarized into two L-shaped areas as shown by the image line 51b, which represents the magnetic boundary. In this example, the lower L-shaped area facing the coil unit 60b is magnetized in the S-Pole, and the upper L-shaped area facing the same is magnetized in the N-Pole. When the magnet 50a is rotated by 180° about an axis which extends in the direction of the optical axis of the objective lens 10 shown in FIG. 1, the same magnetized state as the magnet 50b is achieved.

Figure 5A:
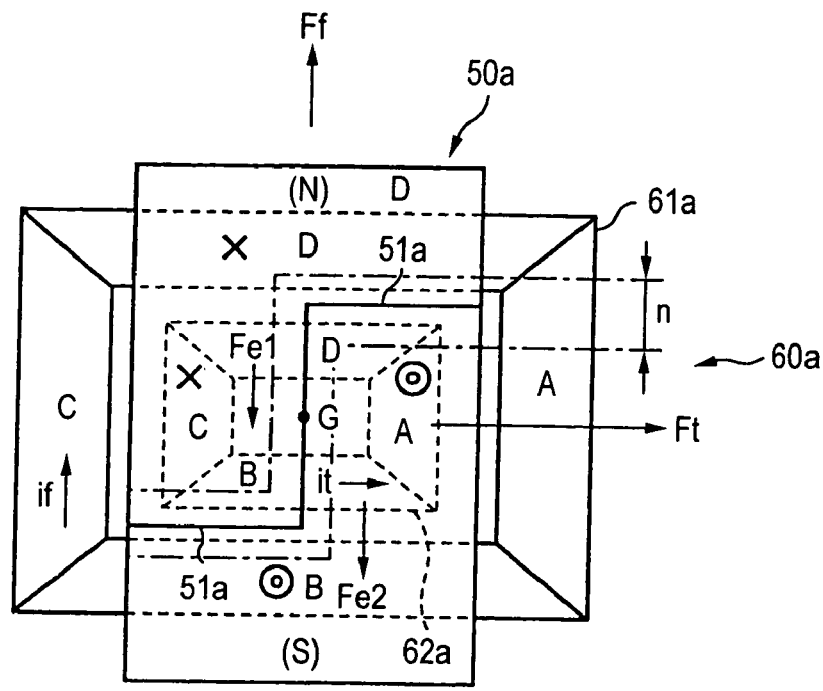
FIGS. 5A and 5B are drawings showing magnetization of magnets and layout of focus coils and tracking coils in an optical head device according to a second embodiment of the invention.

FIG. 5A shows a positional relationship between the magnet 50a and the coil unit 60a when viewing the lens holder 20 in the direction indicated by the arrow V in FIG. 1. In FIG. 5A, the magnet 50a is positioned on the near side of the coil unit 60a. The focus coil 61a is wound in the rectangular shape. The tracking coil 62a is disposed inwardly of the focus coil 61a. The tracking coil 62a is also wound in the rectangular shape.

When the four sides of the rectangular focus coil 61a are imaginary divided into areas A, B, C, and D, as shown in FIG. 5A, the side B of the focus coil 61a is disposed at the position facing the S-Pole of the magnet 50a, so that a magnetic flux travels in the direction from the surface of the drawing toward the near side (shown by a double-circle in the drawing). The side D opposing the side B is disposed at the position facing the N-Pole, so that a magnetic flux travels in the direction from the near side toward the surface of the drawing (shown by a cross in the figure). The side A and the side C of the focus coil 61a are disposed at the position not facing the magnet 50a.

The four sides of the tracking coil 62a are also imaginarily divided into areas A, B, C, and C as shown in FIG. 5A, as in the case of the focus coil 61a. The side A of the tracking coil 62a is disposed at the position facing the S-Pole of the magnet 50a, so that a magnetic flux travels in the direction from the surface of the drawing toward the near side (shown by a double circle). The other shorter side C opposing the side A is disposed at the position facing the pole N, so that a magnetic flux travels in the direction from the near side toward the surface of the drawing (shown by a cross in the figure). The side B and the side D of the tracking coil 62a are disposed at the positions crossing over the N-Pole and the S-Pole of the magnet 50a.

Figure 5B:
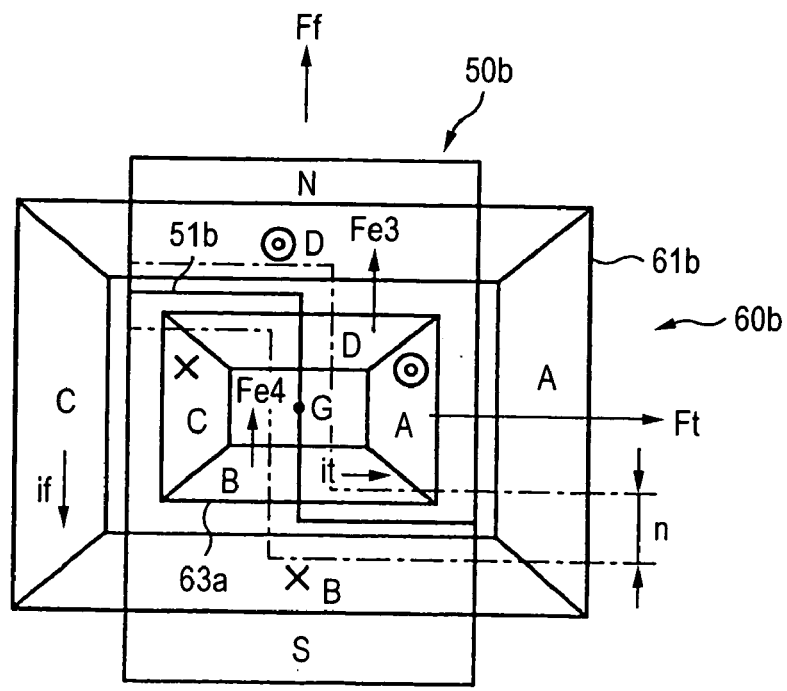

FIG. 5B shows a positional relationship between the magnet 50b and the coil unit 60b when viewing the lens holder 20 in the direction indicated by the arrow V in FIG. 1. In FIG. 5B, the magnet 50b is positioned on the far side of the coil unit 60b. As shown in FIG. 5B, the focus coil 61b is wound in the rectangular shape. The tracking coil 63a is disposed inwardly of the focus coil 61b. The tracking coil 63a is also wound in the rectangular shape.

The side B of the focus coil 61b is disposed at the position facing the S-Pole of the magnet 50b, so that a magnetic flux travels in the direction from the near side toward the surface of the drawing (shown by a cross in the drawing). The side D opposing the side B is disposed at the position facing the N-Pole, so that a magnetic flux travels in the direction from the surface of the drawing toward the near side (shown by a double circle in the drawing). The side A and the side C of the focus coil 61b are disposed at the positions not facing the magnet 50b.

The side A of the tracking coil 63a is disposed at the position facing the N-Pole of the magnet 50b, so that a magnetic flux travels in the direction from the surface of the drawing toward the near side (shown by a double circle in the drawing). The other shorter side C opposing the side A is disposed at the position facing the S-Pole, so that a magnetic flux travels in the direction from the near side toward the surface of the drawing (shown by a cross in the drawing). The side B and the side D of the tracking coil 63a are disposed at the positions crossing over the N-Pole and the S-Pole of the magnet 50b.

The coil surface of the optical head device having the objective lens drive unit of such a construction is disposed in substantially parallel with the radial direction of the optical disk, and the focus coils 61a and 61b and the tracking coils 62a and 63a in the coil units 60a and 60b are energized, a force acting on the coil according to the Fleming's left hand rule is generated, and thus the lens holder 20 can be moved in desired directions. When the focus coils 61a and 61b are energized, a driving force for moving the side B and the side D in the focusing direction (vertical direction in FIGS. 5A and 5B) is generated, and when the tracking coils 62a and 63a are energized, a driving force for moving the side A and the side C in the tracking direction (lateral direction in FIGS. 5A and 5B) is generated.

For example, as shown in FIGS. 5A and 5B, when a current is flown through the focus coils 61a and 61b in the direction indicated by the arrow if, the force Ff directing upward in the drawing is generated. Accordingly, the objective lens 10 can be moved corresponding to the fluctuation of the surface of the optical disk. For example, the objective lens 10 can be moved by the focus coils 61a and 62b in the direction substantially vertical to the information recording surface of the optical disk to adjust a focusing position.

As shown in FIGS. 5A and 5B, when a current is flown in the tracking coils 62a and 63a in the direction indicated by the arrow it, the force Ft acting toward the right in the drawing is generated. Accordingly, the objective lens 10 can be moved corresponding to eccentricity of the optical disk. For example the tracking position can be adjusted by moving the objective lens 10 radially of the optical disk by the tracking coils 62a and 63a.

In the objective lens drive unit of the optical head device according to the present embodiment having the construction described thus far, a driving action in a case in which part of any sides of the tracking coils 62a and 63a are included in the neutral areas n formed in the vicinity of magnetic boundaries 51a and 51b will be described. In FIGS. 5A and 5B, the point G indicates a center of gravity of the movable portion 100. The center of gravity of the movable portion 100 is positioned at substantially center of the coil units 60a and 60b.

As shown in FIG. 5A, the left portion of the side B and the right portion of the side D of the tracking coil 62a are included in the neutral area n in the vicinity of the magnetic boundaries 51a of the magnet 50a. Therefore, when an attempt is made to move the movable portion 100 toward the right in FIG. 5, for example, by energizing the tracking coils 62a and 63a, an upward force, which is generated at the left portion of the side B of the tracking coil 62a (included in the neutral area n), is smaller than a downward force, which is generated on the left portion of the side D of the tracking coil 62a, whereby a relatively downward force Fe1 is generated. Likewise, a downward force, which is generated on the right portion of the side B of the tracking coil 62a, is larger than an upward force, which is generated in the right portion of the side D of the tracking coil 62a (included in the neutral area n), whereby a relatively downward force Fe2 is generated. Therefore, in FIG. 5, when the tracking coil 62a is energized, a downward force, as well as a force to move the lens holder 20 toward the right, is generated. Therefore, an unnecessary driving force for pushing the lens holder 20 downward when viewing in the direction indicated by the arrow V in FIG. 1 is generated.

On the other hand, as shown in FIG. 5B, the right portion of the side B and the left portion of the side D of the tracking coil 63a are included in the neutral area n in the vicinity of the magnetic boundary 51b of the magnet 50b. Therefore, for example, when an attempt is made to move the movable portion 100 toward the right in FIG. 5 by energizing the tracking coils 62a and 63a, a downward force, which is generated at the right portion of the side B of the tracking coil 63a (included in the neutral area n) is smaller than an upward force generated on the right portion of the side D of the tracking coil 63a, whereby a relatively upward force Fe3 is generated. Likewise, an upward force, which is generated on the left portion of the side B of the tracking coil 63a is larger than a downward force generated on the left portion of the side D of the tracking coil 63a (included in the neutral area n), whereby a relatively upward force Fe4 is generated. Therefore, in FIG. 5, when the tracking coil 63a is energized, an upward force, as well as a force to move the lens holder 20 rightward, is generated. Therefore, a driving force for moving the lens holder 20 upward when viewed in the direction indicated by an arrow V in FIG. 1 is generated from the coil unit 60b.

In this embodiment, since the magnetized pattern on the surface of the magnet 50a opposing the coil units 60a and the magnetized pattern on the surface of the magnet 50b opposing the coil units 60b are oriented in the opposite direction, and thus the portions of the side B and the sides D, which are included in the neutral areas n (or the portions near the neutral area n) of the tracking coils 62a and 63a are laterally mirror opposites.

Since the tracking coils 62a and 63a generate almost the same driving force with each other, the direction of an unnecessary driving force generated by the coil unit 60a is opposite from the direction of a unnecessary driving force generated by the coil unit 60b, and the magnitudes are substantially the same. Therefore, the movable portion 100 is capable of moving by a predetermined extent only in the tracking direction without being shifted in the focusing direction, since the both forces cancel each other out. In driving system in this construction, a moment about the radial direction of the optical recording medium is generated.

As regards the focus coils 61a and 61b, although any of the sides B and the sides D are partly included in the neutral areas n, since forces, which are almost the same as forces generated at arbitrary points on the side B of the focus coil 61a in terms of direction and magnitude, are produced at corresponding points on the side D of the focus coil 61a, and forces, which are almost the same as forces generated at arbitrary points on the side D of the focus coil 61b in terms of direction and magnitude, are produced at corresponding points on the side B of the focus coil 61b, an unnecessary moment will not be generated.

When the focus coil 61a is moved in the vertical direction by focus driving, and thus the area of the side B and the side D included in the neutral area n of the focus coil 61a varies, distributions of the driving force on the side B and the side D differ from each other, and thus a moment is generated. However, the area of the side B and the side D included in the neutral arean of the focus coil 61b also varies, and a moment for canceling out the above-described moment is generated, and a rotational component about the direction indicated by the arrow V is not generated.

According to this embodiment, an optical head device, in which the thickness of the movable portion 100 in the focus direction may be reduced as well as the thickness thereof in the tracking direction, is realized.

[Third Embodiment]

Subsequently, referring to FIGS. 6A and 6B, an optical head device according to the third embodiment of the invention will be described. An objective lens drive unit of the optical head device according to this embodiment is similar to the construction shown in FIG. 1 according to the first embodiment except for the construction of the coil units 60a and 60b, and the magnets 50a and 50b. FIG. 6 shows a positional relationship between the magnetized area of the magnets 50a and 50b, the focus coils 61a and 61b, and the tracking coils 62a and 63a in the optical head device according to the present embodiment.

The coil unit 60 in this embodiment is wound, for example, in a rectangular shape, and the focus coils 61a and 61b connected in series are fixed to both side surfaces S1 and S2 of the lens holder 20, respectively. The focus coils 61a and 61b are wound in such a manner that substantially the same forces are produced in the focusing direction when energized. In the coil unit 60, the tracking coils 62a and 63a are fixed to two side surfaces, respectively, which are different from the both side surfaces S1 and S2 of the lens holder 20. The tracking coil 62a and the tracking coil 63a are connected in series. The tracking coils 62a and 63a are wound in such a manner that substantially the same force is generated in the tracking direction when energized.

The magnet 50a, which is substantially rectangular solid, is bipolarized into two L-shaped areas as shown by the image line 51a, which represents the magnetic boundary. In this example, the lower L-shaped area facing the focus coil 61a (lower side in FIG. 6A) is magnetized in the S-Pole, and the upper L-shaped area facing the same is magnetized in the N-Pole.

The magnet 50b, which is substantially rectangular solid, is bipolarized into two L-shaped areas as shown by the image line 51b, which represents the magnetic boundary. In this example, the lower L-shaped area facing the focus coil 61b is magnetized in the N-Pole, and the upper L-shaped area facing the same is magnetized in the S-Pole. When the magnet 50a is rotated by 180° about the direction indicated by the arrow V and the direction orthogonal to the direction of the optical axis in FIG. 1, the magnet 50a will be the same magnetized state as the magnet 50b.

Figure 6A:
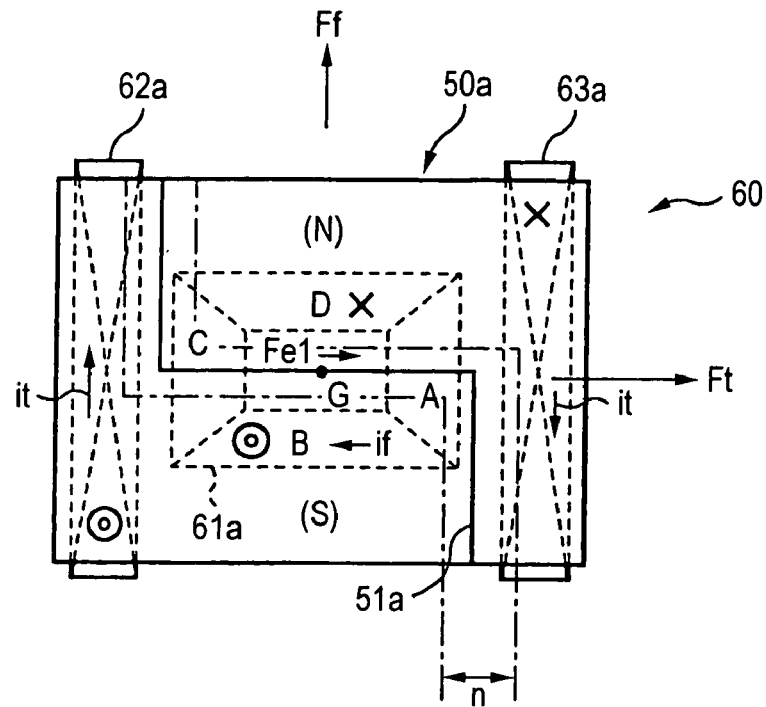
FIGS. 6A and 6B are drawings showing magnetization of the magnets and layout of focus coils and tracking coils in an optical head device according to a third embodiment of the invention.

FIG. 6A shows a positional relationship between the magnet 50a and the coil unit 60 when viewing the lens holder 20 in the direction indicated by the arrow V in FIG. 1. In FIG. 6A, the magnet 50a is positioned on the near side of the coil unit 60. The focus coil 61a is wound in a rectangular shape.

The four sides of the rectangular focus coil 61a is imaginarily divided into areas A, B, C, and D as shown in FIG. 6A. The side B of the focus coil 61a is disposed at the position facing the S-Pole of the magnet 50a, so that a magnetic flux travels in the direction from the surface of the drawing toward the near side (shown by a double-circle in the drawing). The side D opposing the side B is disposed at the position facing the N-Pole, so that a magnetic flux travels in the direction from the near side toward the surface of the drawing (shown by a cross in the drawing). The side A and the side C of the focus coil 61a are disposed at the positions crossing over the N-Pole and the S-Pole.

Figure 6B:
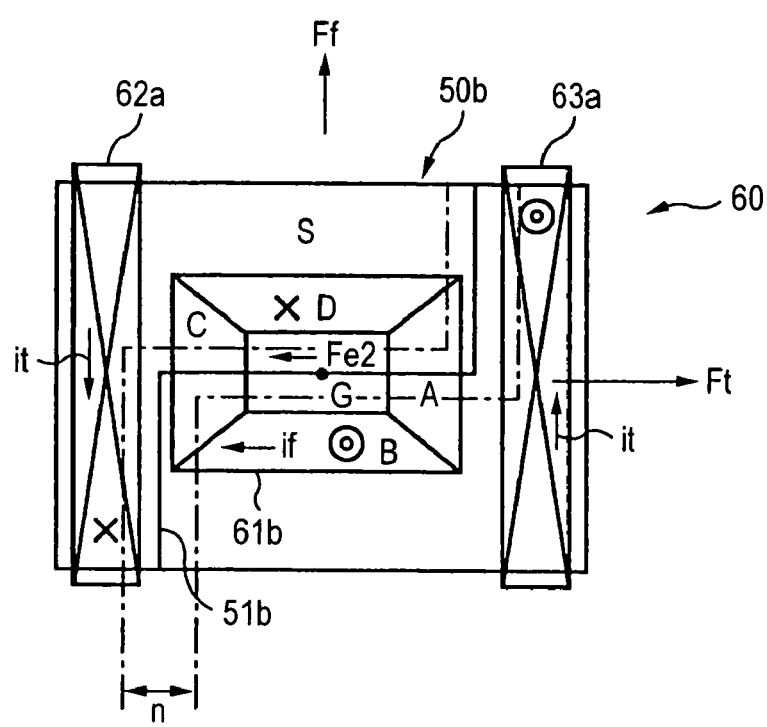

FIG. 6B shows a positional relationship between the magnet 50b and the coil unit 60 when viewing the lens holder 20 in the direction indicated by the arrow V in FIG. 1. In FIG. 6B, the magnet 50b is located on the far side with respect to the coil unit 60. As shown in FIG. 6B, the focus coil 61b is wound in a rectangular shape.

The side B of the focus coil 61b is disposed at the position facing the N-Pole of the magnet 50b, so that a magnetic flux travels in the direction from the surface of the drawing toward the near side (shown by a double-circle in the drawing). The side D opposing the side B is disposed at the position facing the S-Pole, so that a magnetic flux travels in the direction from the near side toward the surface of the drawing (shown by a cross in the drawing). The side A and the side C of the focus coil 61b are disposed at the positions crossing over the N-Pole and the S-Pole of the magnet 50b.

One side of the tracking coil 62a is disposed at the position facing the S-Pole of the magnet 50a, so that a magnetic flux travels in the direction from the surface of the drawing toward the near side (shown by a double-circle in the drawing). The other side opposing the aforementioned one side is disposed at the position facing the S-Pole of the magnet 50b, so that a magnetic flux travels in the direction from the near side toward the surface of the drawing (shown by a cross in the drawing).

One side of the tracking coil 63a is disposed at the position facing the N-Pole of the magnet 50a, so that a magnetic flux travels in the direction from the near side toward the surface of the drawing (shown by a cross in the drawing). The other side opposing the aforementioned one side is disposed at the position facing the N-Pole of the magnet 50b, so that a magnetic flux travels in the direction from the surface of the drawing toward the near side (shown by a double-circle in the drawing)

When the coil surface of the optical head device having the objective lens drive unit of such a construction is disposed in substantially parallel with the radial direction of the optical disk, and the focus coils 61a and 61b, and the tracking coils 62a and 63a in the coil unit 60 are energized, a force acting on the coil according to the Fleming's left hand rule is generated, and thus the lens holder 20 can be moved in desired directions. When the focus coils 61a and 61b are energized, a driving force for moving the side B and the side D in the focusing direction (vertical direction in FIGS. 6A and 6B) is generated, and when the tracking coils 62a and 63a are energized, a driving force for moving the same in the tracking direction (lateral direction in FIGS. 6A and 6B) is generated.

For example, as shown in FIGS. 6A and 6B, when a current is flown through the focus coils 61a and 61b in the direction indicated by the arrow if, the force Ff directing upward in the drawing is generated. Accordingly, the objective lens 10 can be moved corresponding to the fluctuation of the surface of the optical disk. For example, the focusing position can be adjusted by moving the objective lens 10 in the direction substantially vertical to the information recording surface of the optical disk by the focus coils 61a and 61b.

As shown in FIGS. 6A and 6B, when a current is flown through the tracking coils 62a and 63a in the direction indicated by the arrow it, the force Ft acting toward the right in the drawing is generated. Accordingly, the objective lens 10 can be moved corresponding to eccentricity of the optical disk. For example, the tracking position can be adjusted by moving the objective lens 10 radially of the optical disk by the tracking coils 62a and 63a.

In the objective lens drive unit of the optical head device having the construction described thus far according to this embodiment, a driving action in a case in which part of any sides of the focus coils 61a and 61b are included in the neutral areas n formed in the vicinity of the magnetic boundaries 51a and 51b will be described. In FIGS. 6A and 6B, the point G indicates the center of gravity of the movable portion 100. The center of gravity of the movable portion 100 is positioned at substantially center of the coil unit 60.

As shown in FIG. 6A, the lower portion of the side A and the upper portion of the side C of the focus coil 61a are included in the neutral area n in the vicinity of the magnetic boundary 51a of the magnet 50a. Therefore, when an attempt is made to move the movable portion 100 upward in FIG. 6, for example, by energizing the focus coils 61a and 61b, a leftward force generated on the lower portion of the side A of the focus coil 61a is smaller than a rightward force generated on the lower portion of the side C of the focus coil 61a (included in the neutral area n), whereby a relatively rightward force is generated. Likewise, a leftward force, which is generated on the upper portion of the side A of the focus coil 61a (included in the neutral area n), is smaller than a rightward force generated on the upper portion of the side C of the focus coil 61a, whereby a relatively rightward force is generated. Therefore, in FIGS. 6A and 6B, when the focus coil 61a is energized, a rightward force, as well as a force to move the lens holder 20 upward, is generated. Therefore, an unnecessary driving force Fe1 for shifting the lens holder 20 rightward when viewing in the direction indicated by the arrow V in FIG. 1 is generated from the focus coil 61a.

On the other hand, as shown in FIG. 6B, the upper portion of the side A and the lower portion of the side C of the focus coil 61b are included in the neutral area n in the vicinity of the magnetic boundary 51b of the magnet 50b. Therefore, when an attempt is made to move the movable portion 100 upward in FIG. 6 by energizing the focus coils 61a and 61b, a rightward force, which is generated on the upper portion of the side A of the focus coil 61b (included in the neutral area n), is smaller than a leftward force, which is generated on the upper portion of the side C of the focus coil 61b, whereby a relatively leftward force is generated. Likewise, a rightward force, which is generated on the lower portion of the side C of the focus coil 61b (included in the neutral area n), is smaller than a leftward force, which is generated on the lower portion of the side A of the focus coil 61b, whereby a relatively leftward force is generated. Therefore, in FIGS. 6A and 6B, when the focus coil 61b is energized, a leftward force, as well as a force to move the lens holder upward, is generated. Therefore, an unnecessary driving force Fe2 for shifting the lens holder 20 leftward when viewing in the direction indicated by the arrow V in FIG. 1 is generated from the focus coil 61a.

In this embodiment, since the magnetized pattern on the surface of the magnet 50a opposing the coil unit 60a and the magnetized pattern on the surface of the magnet 50b opposing the coil unit 60b are oriented in the opposite direction, and thus the portions of the side B and the sides D, which are included in the neutral areas n (or the portions near the neutral area n) of the tracking coils 62a and 63a are laterally mirror opposites.

Since the focus coils 61a and 61b generate almost the same driving force with each other, the direction of an unnecessary driving force generated at the focus coil 61a is opposite from the direction of an unnecessary driving force generated at the focus coil 60b, and the magnitudes are substantially the same. Therefore, the movable portion 100 is capable of moving by a predetermined extent only in the focusing direction without being shifted in the tracking direction, since the both forces cancel each other out. In driving system in this construction, a moment about the optical axis of the objective lens is generated.

As regards the tracking coils 62a and 63a, although part of the sides are included in the neutral areas n, since forces, which are almost the same as forces generated at arbitrary points on the side of the tracking coil 62a in terms of direction and magnitude, are produced at corresponding points on the side of the tracking coil 63a, and forces, which are almost the same as forces generated at arbitrary point on the side of the tracking coil 62a in terms of direction and magnitude, are produced at corresponding points on the side of the tracking coil 63a, an unnecessary moment will not be generated.

When the tracking coil 62a is moved in the lateral direction by tracking driving, and thus the area included in the neutral area n of the tracking coil 61a varies, distributions of the driving force differ from each other, and thus a moment is generated. However, the area included in the neutral area n of the tracking coil 63a also varies, and a moment for canceling out the above-described moment is generated, and a rotational component about the direction indicated by the arrow V is not generated.

According to this embodiment, an optical head device, in which the thickness of the movable portion 100 in the focus direction maybe reduced and the thickness thereof in the tracking direction may also be reduced, is realized.

Figure 7:
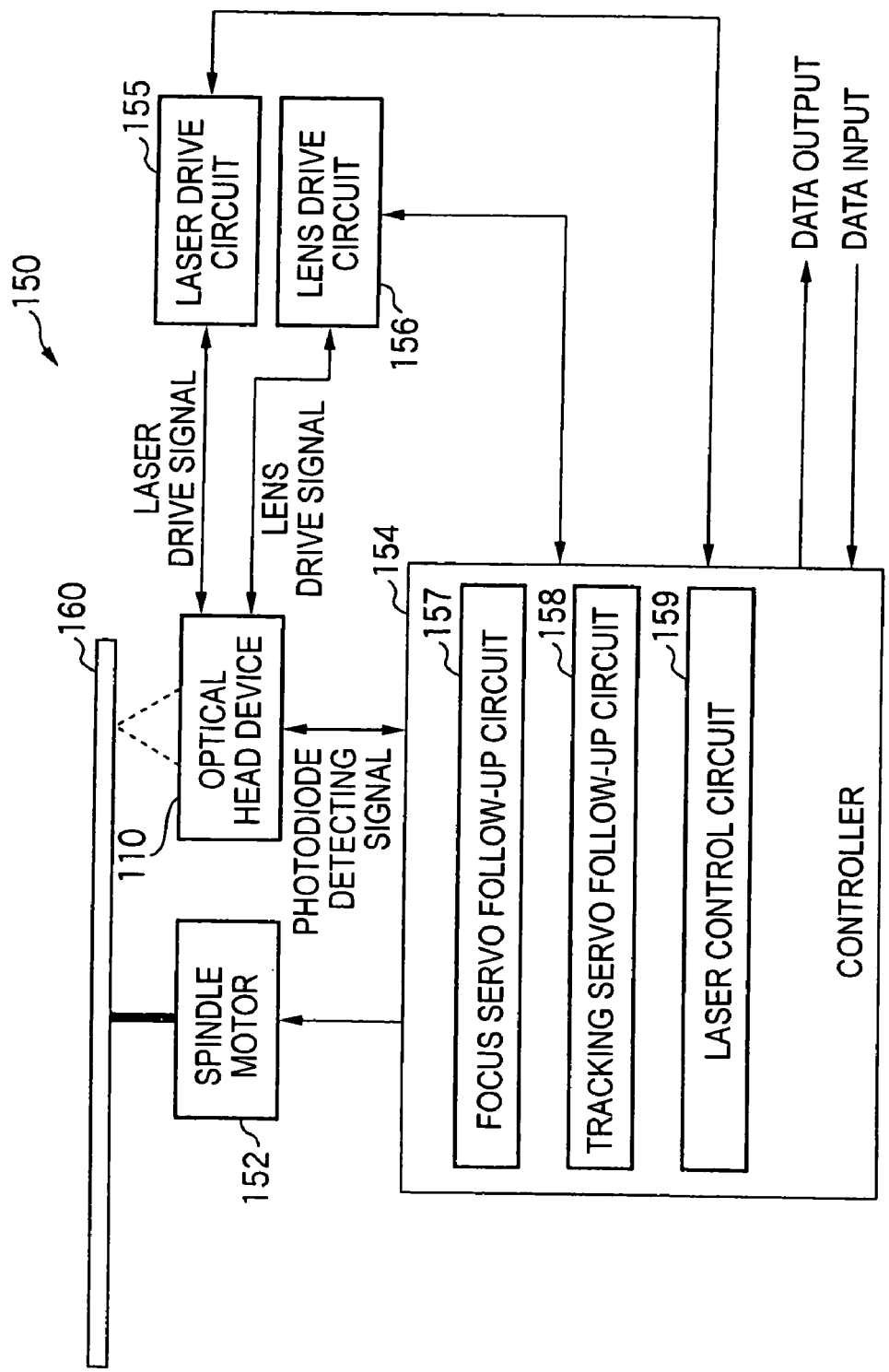
FIG. 7 is a drawing showing a general construction of an optical reproducing apparatus including any one of the optical head devices according to the first to the third embodiments of the invention.
Figure 8:
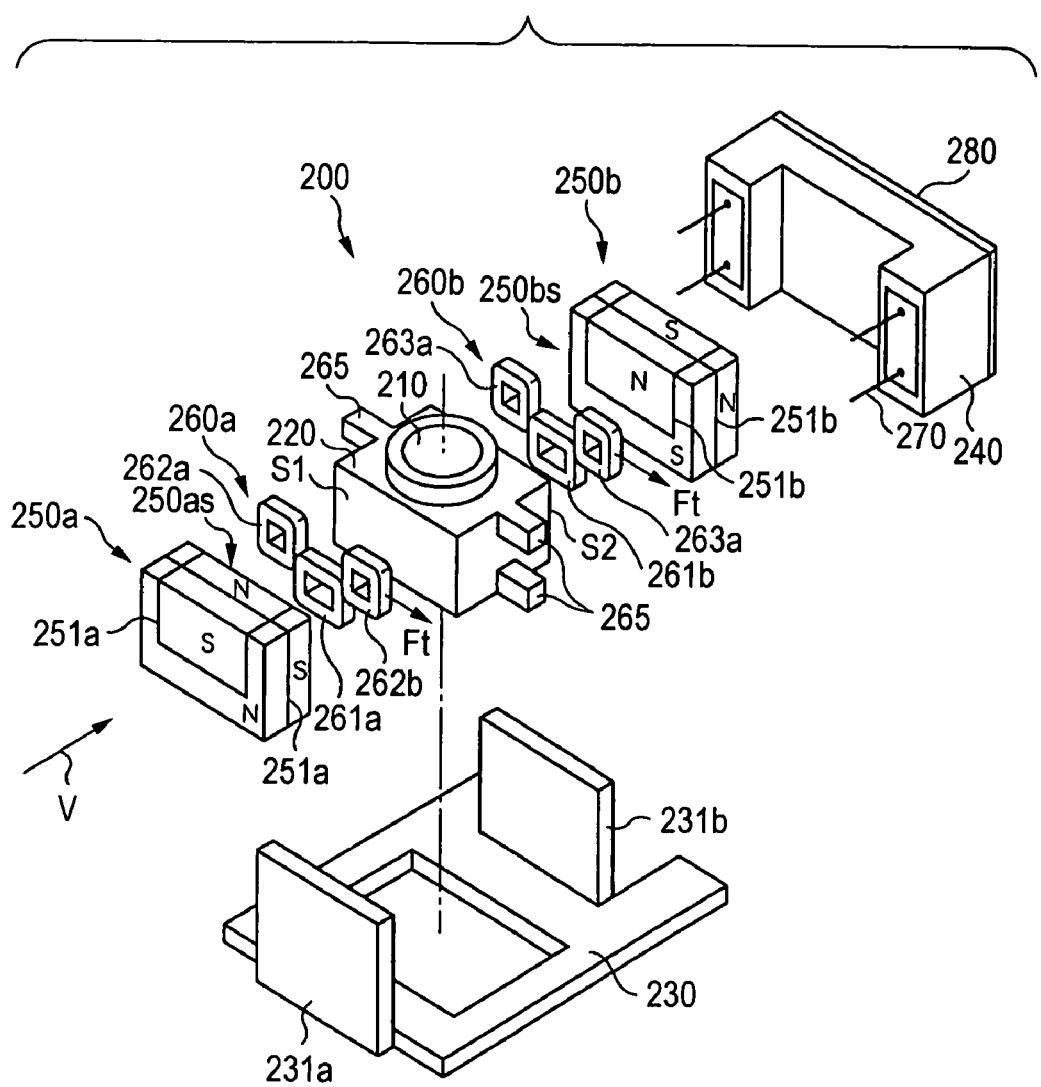
FIG. 8 is an exploded perspective view of an objective drive unit in the related art.
Figure 9A:
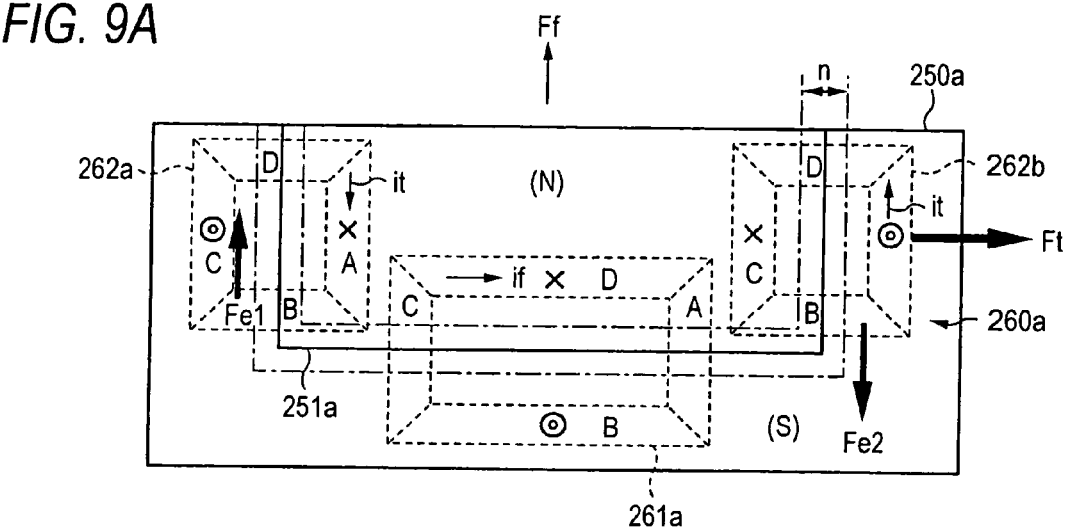
FIGS. 9A and 9B are drawings showing magnetization of magnets and layout of focus coils and tracking coils in an optical head device in the related art.
Figure 9B:
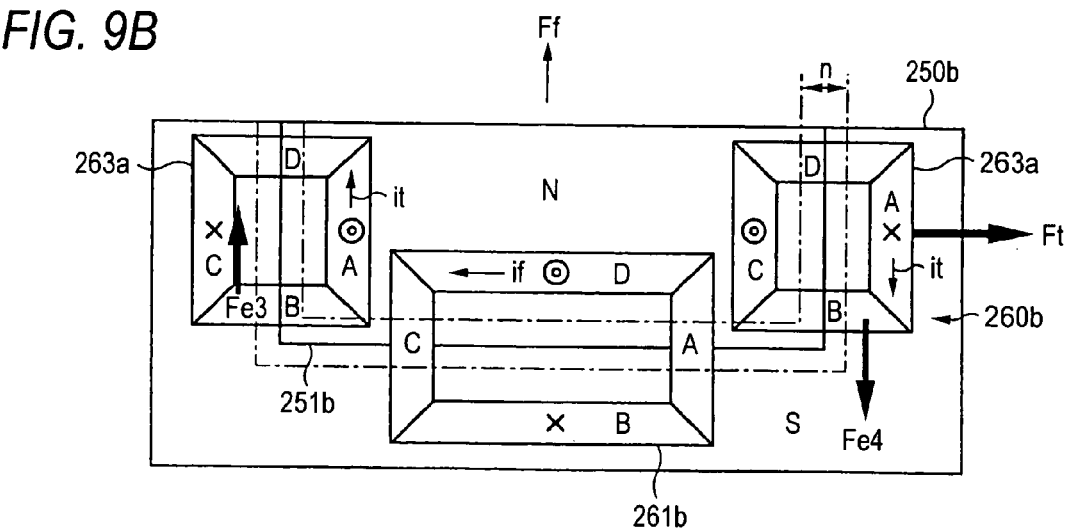

FIG. 7 shows a general construction of an optical reproducing apparatus 150 including an optical head device 110 according to the aforementioned embodiments. The optical reproducing apparatus 150 includes a spindle motor 152 for rotating an optical recording medium 160 as shown in FIG. 7, the optical head device 110 for irradiating a laser beam onto the optical recording medium 160 and for receiving a reflected beam therefrom, a controller 154 for controlling the operation of the spindle motor 152 and the optical head device 110, a laser drive circuit 155 for supplying laser drive signals to the optical head device 110, and a lens drive circuit 156 for supplying lens driving signals to the optical head device 110.

The controller 154 includes a focus servo follow-up circuit 157, a tracking servo follow-up circuit 158, and a laser control circuit 159. When the focus servo follow-up circuit 157 is activated, a laser beam is focused on a recording surface of the rotating optical recording medium 160. In contrast, when the tracking servo follow-up circuit 158 is activated, a spot of the laser beam automatically follows an eccentric signal track on the optical recording medium 160. The focus servo follow-up circuit 157 and the tracking servo follow-up circuit 158 are provided with an automatic gain control function for automatically adjusting the focus gain and an automatic gain control function for automatically adjusting the tracking gain, respectively. The laser control circuit 159 is a circuit for generating laser drive signals supplied from the laser drive circuit 155 for generating suitable laser drive signals based on recording condition setting information recorded on the optical recording medium 160.

The focus servo follow-up circuit 157, the tracking servo follow-up circuit 158, and the laser control circuit 159 do not have to be integrated in the controller 154, and they may be separate components from the controller 154. In addition, they do not have to be physical circuits, and may be software implemented in the controller 154. The optical reproducing apparatus 150 may be integrated in the optical recording/reproducing apparatus, which is provided with a recording function, or may be a reproduction-specific device, which is not provided with a recording function.

The invention is not limited to the above-described embodiments, and may be modified in various ways.

For example, the coil units 60a and 60b including the focus coils 61a and 61b, and the tracking coils 62a, 62b, 63a, and 63b have been described in the above-described embodiments. However, the invention is not limited thereto, and a construction including a tilt coil in the coil units 60a and 60b may be employed. The tilt coil may be mounted on the side surface of the lens holder 20. In addition, the invention may be applied to an optical head device including a coil unit constructed in such a manner that the focus coil and the tracking coil are also capable of tilting operation.

As described thus far, according to the invention, even when a coil for driving an objective lens is included in a neutral area in the vicinity of a magnetic boundary, the objective lens can be moved to a predetermined position.

What is claimed is:

1. An optical head device comprising:
   a lens holder including an objective lens mounted thereon, the lens including an optical axis;
   a first driving force generating unit including:
      a first coil unit held on of a first side surface of the lens holder, and
      a first magnet facing the first coil unit, and configured to generate a first driving force and either (1) a second driving force different from the first driving force or (2) a first moment based on the second driving force; and
   a second driving force generating unit including:
      a second coil unit held on a second side surface of the lens holder opposing the first side surface, and
      a second magnet facing the second coil unit and configured to generate a third driving force and either (1) a fourth driving force or (2) a second moment for canceling the second driving force or the moment generated by the first driving force generating unit, wherein
   the first and second magnets are multi-polarized and magnetic poles of at least one of the first and second magnets are asymmetrical about a plane taken at a midpoint of the at least one magnet, orthogonal to the optical axis, and which pierces multiple poles of the at least one magnet, and
   wherein each of the first and second coil units includes at least one focus coil and at least two tracking coils arranged such that the focus coil and the at least two tracking coils in the first coil unit are symmetrically disposed in relation to the focus coil and the at least two tracking coils in the second coil unit, respectively, about a plane including the optical axis and orthogonal to an axis of one of the focus coils.

2. An optical head device according to claim 1, wherein the second driving force is generated in a focusing direction.

3. An optical head device according to claim 1, wherein the second driving force is generated in a tracking direction.

4. An optical head device according to claim 1, wherein:
   the focus coil of the first drive unit is partly positioned in a vicinity of a magnetic boundary on an opposed surface of the first magnet; and
   the focus coil of the second drive unit is partly positioned in a vicinity of a magnetic boundary on an opposed surface of the second magnet.

5. An optical head device according to claim 4, wherein:
   a surface of the first magnet opposing the first drive coil comprises a L-shaped area magnetized in a first magnetic pole and an inverted L-shaped area magnetized in a second magnetic pole; and a surface of the second magnet opposing the second drive coil comprises a L-shaped area magnetized in any one of the first and second magnetic poles and an inverted L-shaped area magnetized in the other magnetic pole.

6. An optical head device according to claim 1, wherein the first and second magnets are bipolarized.

7. An optical head device comprising:
a lens holder having an objective lens mounted thereon, the lens including an axis;
a first driving force generating unit including:
  a first coil unit having a first drive coil held on a first side surface of the lens holder, and
  a first magnet facing the first coil unit and configured to generate a first driving force and a first moment; and
a second driving force generating unit including:
  a second coil unit held on a second side surface of the lens holder opposing the first side surface, and
  a second magnet facing the second coil unit and configured to generate a second force and a second moment for canceling the first moment generated by the first driving force generating unit, wherein magnetic poles of at least one of the first and second magnets are asymmetrical about a plane taken at a midpoint of the at least one magnet, orthogonal to the optical axis, and which pierces multiple poles of the at least one magnet, and
  wherein each of the first and second coil units includes at least one focus coil and at least two tracking coils arranged such that the focus coil and the at least two tracking coils in the first coil unit are symmetrically disposed in relation to the focus coil and the at least two tracking coils in the second coil unit, respectively, about a plane including the optical axis and orthogonal to an axis of one of the focus coils.

8. An optical head device according to claim 7, wherein:
the focus coil of the first coil unit is partly positioned in a vicinity of a magnetic boundary on an opposed surface of the first magnet; and
the focus coil of the second coil unit is partly positioned in a vicinity of a magnetic boundary on an opposed surface of the second magnet.

9. An optical head device according to claim 8, wherein:
a surface of the first magnet opposing the first drive coil comprises a L-shaped area magnetized in a first magnetic pole and an inverted L-shaped area magnetized in a second magnetic pole; and
a surface of the second magnet opposing the second drive coil comprises a L-shaped area magnetized in any one of the first and second magnetic poles and an inverted L-shaped area magnetized in the other pole.

10. An optical head device comprising:
a lens holder including an objective lens mounted thereon, the lens including an optical axis
a first driving force generating unit including:
  a first coil unit including a first drive coil held on of a first side surface of the lens holder, and
  a first magnet facing the first coil unit, and configured to generate a first driving force and either (1) a second driving force different from the first driving force or (2) a first moment based on the second driving force; and
a second driving force generating unit including:
  a second coil unit including a second drive coil held on a second side surface of the lens holder opposing the first side surface, and
  a second magnet facing the second coil unit and configured to generate a third driving force and either (1) a fourth driving force or (2) a second moment for canceling the second driving force or the moment generated by the first driving force generating unit, wherein
the first and second magnets are multi-polarized and magnetic poles of at least one of the first and second magnets are asymmetrical about a plane taken at a midpoint of the at least one magnet, orthogonal to the optical axis, and which pierces multiple Doles of the at least one magnet, wherein
the first drive coil is partly positioned in the vicinity of a magnetic boundary on an opposed surface of the first magnet; and
the second drive coil is partly positioned in the vicinity of a magnetic boundary on an opposed surface of the second magnet;
a surface of the first magnet opposing the first drive coil comprises a recessed area magnetized in a first magnetic pole and a projected area fitted therein and magnetized in a second magnetic pole; and
a surface of the second magnet opposing the second drive coil comprises a recessed area magnetized in the second magnetic pole and disposed in a direction opposite from the recessed area of the first magnet, and a projected area fitted therein and magnetized in the first magnetic pole.

11. An optical head device comprising:
a lens holder having an objective lens mounted thereon, the lens including an axis;
a first driving force generating unit including:
  a first coil unit having a first drive coil held on a first side surface of the lens holder, and
  a first magnet facing the first coil unit and configured to generate a first driving force and a first moment, a distribution of the first driving force of the first drive coil being different; and
a second driving force generating unit including:
  a second coil unit having a second drive coil held on a second side surface of the lens holder opposing the first side surface, and
  a second magnet facing the second coil unit and configured to generate a second force and a second moment for canceling the first moment generated by the first driving force generating unit, wherein magnetic noles of at least one of the first and second magnets are asymmetrical about a plane taken at a midpoint of the at least one magnet, orthogonal to the optical axis, and which pierces multiple poles of the at least one magnet, wherein
the first drive coil is partly positioned in the vicinity of a magnetic boundary on an opposed surface of the first magnet; and
the second drive coil is partly positioned in a vicinity of a magnetic boundary on an opposed surface of the second magnet, wherein:
a surface of the first magnet opposing the first drive coil comprises a recessed area magnetized in a first magnetic pole and a projected area fitted therein and magnetized in a second magnetic pole; and
a surface of the second magnet opposing the second drive coil comprises a recessed area magnetized in the second magnetic pole and disposed in a direction opposite from the recessed area of the first magnet, and a projected area fitted therein and magnetized in the first magnetic pole.

12. An optical reproducing apparatus including an optical head device comprising:
- a lens holder including an objective lens mounted thereon, the lens including an optical axis;
- a first driving force generating unit including:
  - a first coil unit held on a first side surface of the lens holder, and
  - a first magnet facing the first coil unit and configured to generate a first driving force and either (1) a second driving force different from the first driving force or (2) a first moment based on the second driving force; and
- a second driving force generating unit including:
  - a second coil unit held on a second side surface of the lens holder opposing the first side surface, and
  - a second magnet facing the second coil unit and configured generate a third driving force and either (1) a fourth driving force or (2) a second moment for canceling the second driving force or the first moment generated by the first driving force generating unit, wherein
- the first and second magnets are multi-polarized and magnetic poles of at least one of the first and second magnets are asymmetrical about a plane taken at a midpoint of the at least one magnet, orthogonal to the optical axis, and which pierces multiple poles of the at least one magnet, and
- wherein each of the first and second coil units includes at least one focus coil and at least two tracking coils arranged such that the focus coil and the at least two tracking coils in the first coil unit are symmetrically disposed in relation to the focus coil and the at least two tracking coils in the second coil unit, respectively, about a plane including the optical axis, and orthogonal to an axis of one of the focus coils.

13. An optical reproducing apparatus according to claim 12, wherein the first and second magnets are bipolarized.

14. An optical reproducing apparatus including an optical head device comprising:
- a lens holder including an objective lens mounted thereon, the lens including an optical axis;
- a first driving force generating unit including:
  - a first coil unit having a first drive coil held on a first side surface of the lens holder, and
  - a first magnet facing the first coil unit and configured to generate a first driving force and a moment; and
- a second driving force generating unit including:
  - a second coil unit having a second drive coil held on a second side surface of the lens holder opposing the first side surface, and
  - a second magnet facing the second coil unit and configured to generate a second force and a second moment for canceling the first moment generated by the first driving force generating unit, wherein magnetic poles of at least one of the first and second magnets are asymmetrical about a plane taken at a midpoint of the at least one magnet, orthogonal to the axis, and which pierces multiple poles of the at least one magnet, and
  - wherein each of the first and second coil units includes at least one focus coil and at least two tracking coils arranged such that the focus coil and the at least two tracking coils in the first coil unit are symmetrically disposed in relation to the focus coil and the at least two tracking coils in the second coil unit, respectively, about a plane including the optical axis, and orthogonal to an axis of one of the focus coils.

15. An optical head device according to claim 1, wherein the first and second magnets are configured to generate the first and second moments and not the second and fourth driving forces.

16. An optical head device comprising:
- an objective lens mounted on a lens holder;
- a first coil unit arranged on a first side of the lens holder;
- a second coil unit arranged on a second side of the lens holder;
- a first magnet facing the first coil unit; and
- a second magnet facing the second coil unit, wherein:
  - each of the first and second coil units comprises at least one focus coil and at least two tracking coils arranged such that the focus coil and at the at least two tracking coils in the first coil unit are symmetrically disposed in relation to the focus coil and at least two tracking coils in the second coil unit, respectively, about a plane including the optical axis and orthogonal to an axis of one of the focus coils; and
  - each of the first and second magnets is bipolarized and comprises a recessed area and a projected area fitted to the recessed area.

17. An optical head device according to claim 16, wherein each of the first and second coil units comprises a substantially rectangular focus coil and two tracking coils arranged within the focus coil and connected in series inwardly of the focus coil.

18. An optical head device comprising:
- an objective lens mounted on a lens holder;
- a first coil unit arranged on a first side of the lens holder;
- a second coil unit arranged on a second side of the lens holder;
- a first magnet facing the first coil unit; and
- a second magnet facing the second coil unit, wherein:
  - each of the first and second coil units comprises at least one focus coil and at least two tracking coils; and
  - each of the first and second magnets is bipolarized and comprises a recessed area and a projected area fitted to the recessed area, wherein, in each of the first and second magnets,
  - the recessed area is divided in a first recessed portion, adjacent one of the first and second coil units and having a first magnetic polarity, and a second recessed portion having a second magnetic polarity different from the first magnetic polarity; and
  - the projected area is divided in a first projected portion, adjacent one of the first and second coil units and having the second magnetic polarity, and a second projected portion having the first magnetic polarity.

19. An optical head device comprising:
- an objective lens mounted on a lens holder;
- a first coil unit arranged on a first side of the lens holder;
- a second coil unit arranged on a second side of the lens holder;
- a first magnet facing the first coil unit; and
- a second magnet facing the second coil unit, wherein:
  - each of the first and second coil units comprises at least one focus coil and at least two tracking coils; and
  - each of the first and second magnets is bipolarized and comprises a recessed area and a projected area fitted to the recessed area, wherein
  - the first and second coil units are arranged in first and second planes substantially parallel with the first and second sides, respectively; and the first and second coil units are arranged symmetrically with respect to a third plane including an optical axis of the optical lens and intersecting with the first and second planes, wherein each of the first and second coil units comprises a substantially rectangular focus coil and two tracking coils arranged within the focus coil and connected in series inwardly of the focus coil, wherein, in each of the first and second magnets, the recessed area is divided in a first recessed portion, adjacent one of the first and second coil units and having a first magnetic polarity, and a second recessed portion having a second magnetic polarity different from the first magnetic polarity; and the projected area is divided in a first projected portion, adjacent one of the first and second coil units and having the second magnetic polarity, and a second projected portion having the first magnetic polarity.

20. An optical head device according to claim 19, where the first magnetic polarity is N-pole and the second magnetic polarity is S-pole.

* * * * *